US012682258B2

(12) United States Patent
Watson et al.

(10) Patent No.: US 12,682,258 B2
(45) Date of Patent: Jul. 14, 2026

(54) OPERATIONAL FORECASTING SYSTEM BASED ON ANOMALOUS BEHAVIORS IN COMPLEX SYSTEMS

(71) Applicant: Oregon State University, Corvallis, OR (US)

(72) Inventors: James R. Watson, Corvallis, OR (US); Andrew John Woodill, Corvallis, OR (US); Maria Kavanaugh, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 1062 days.

(21) Appl. No.: 17/323,823

(22) Filed: May 18, 2021

(65) Prior Publication Data

US 2022/0253727 A1 Aug. 11, 2022

Related U.S. Application Data

(60) Provisional application No. 63/027,651, filed on May 20, 2020.

(51) Int. Cl.
*G06N 20/00* (2019.01)
*G06F 17/18* (2006.01)
*G06N 5/04* (2023.01)

(52) U.S. Cl.
CPC .............. *G06N 5/04* (2013.01); *G06F 17/18* (2013.01); *G06N 20/00* (2019.01)

(58) Field of Classification Search
CPC .......... G06N 5/04; G06N 20/00; G06F 17/18
See application file for complete search history.

(56) References Cited

U.S. PATENT DOCUMENTS

| | | | | |
|---|---|---|---|---|
| 10,373,068 | B2 * | 8/2019 | Baughman | G06N 20/00 |
| 2005/0246105 | A1 * | 11/2005 | Faber | G16B 40/00 |
| | | | | 702/19 |
| 2008/0114564 | A1 * | 5/2008 | Ihara | G06F 16/35 |
| | | | | 702/158 |

(Continued)

OTHER PUBLICATIONS

Barbier, M. et al., "The spatial dynamics of predators and the benefits and costs of sharing information", PLoS computational biology, 12(10):e1005147. Oct. 20, 2016. https://doi.org/10.1371/journal.pcbi.1005147. 22 pages.

(Continued)

*Primary Examiner* — Tamara T Kyle
*Assistant Examiner* — William Wong
(74) *Attorney, Agent, or Firm* — MUGHAL GAUDRY & FRANKLIN PC

(57) ABSTRACT

A general-purpose approach to solving the core problems of detecting and predicting the actions of invisible actors, and the consequential challenges of intervention and prevention. The operational forecasting system is applied to data gathered from complex systems. The operational forecasting system uses novel early-warning signals that are based on anomalous behaviors of actors/agents that are observed, as they respond to those unobserved actors that are the source of systemic change. The operational forecasting system targets predicting when an event will occur, before it does, based on the anomalous behaviors of observed actors responding to those invisible actors that are creating the perturbation (i.e. the murmuration).

11 Claims, 16 Drawing Sheets

(56) References Cited

U.S. PATENT DOCUMENTS

| | | | | |
|---|---|---|---|---|
| 2011/0087495 | A1* | 4/2011 | O'Neill | G06Q 40/02 |
| | | | | 705/1.1 |
| 2017/0011299 | A1* | 1/2017 | Ebert | G06Q 10/06 |
| 2017/0177938 | A1* | 6/2017 | Papanikolopoulos | |
| | | | | G06V 20/17 |
| 2019/0068627 | A1* | 2/2019 | Thampy | H04L 63/1425 |
| 2020/0264268 | A1* | 8/2020 | Moore | G01S 13/767 |
| 2020/0264296 | A1* | 8/2020 | Dunagan | G08G 3/00 |
| 2020/0410301 | A1* | 12/2020 | Delay | G08G 3/00 |
| 2021/0077005 | A1* | 3/2021 | Ambeck-Madsen | A61B 5/18 |
| 2021/0192356 | A1* | 6/2021 | Moridi | G06N 3/088 |
| 2021/0327289 | A1* | 10/2021 | Kim | G08G 5/0013 |

OTHER PUBLICATIONS

Bastardie, F. et al., "Effects of fishing effort allocation scenarios on energy efficiency and profitability: an individual-based model applied to Danish fisheries", Fisheries Research, 106(3):501-516. Nov. 2010 Conference: Energy Use in Fisheries: Improving Efficiency and Technological Innovations from a Global Perspective At: Seattle, Washington, USA. 2 pages.

Bisbal, G. et al., "The southeast South American shelf large marine ecosystem: Evolution and components", Marine Policy, 19(1):21-38. Jan. 1995, pp. 21-38.

Burgess, M., "Opportunities for agent-based modelling in human dimensions of fisheries. Fish and Fisheries", vol. 21, Issue3. May 2020. pp. 570-587 [first published Feb. 28, 2020]. https://doi.org/10.1111/faf.12447.

Couzin, I. et al., "Effective leadership and decision-making in animal groups on the move", Nature, 433(7025):513-516.

Cullis-Suzuki, S. et al., "Failing the high seas: a global evaluation of regional fisheries management organizations", Marine Policy 2010, vol. 34, issue 5, 1036-1042 (7 pages). https://doi.org/10.1016/j.marpol.2010.03.002.

Dunn, D. et al., "Empowering high seas governance with satellite vessel tracking data. Fish and Fisheries", Fish and Fisheries 19(4):729-739, (11 pages).

Ford, J. et al., "Detecting suspicious activities at sea based on anomalies in automatic identification systems transmissions", PloS one, 13(8):e0201640. https://doi.org/10.1371/journal.pone.0201640. published Aug. 9, 2018 (13 pages).

Jolliffe, "Principal component analysis: a review and recent developments", Phil. Trans. R. Soc. A vol. 374, Iss. 2065. http://dx.doi.org/10.1098/rsta.2015.0202. (16 pages).

Kroodsma, D. et al., "Tracking the global footprint of fisheries", Science, 359(6378):904-908. Feb. 23, 2018 (5 pages).

Lubchenco, J. et al., "Making waves: The science and politics of ocean protection", Science, 350(6259):382-383. Oct. 23, 2015. (10 pages).

Mendenhall, E. et al., "Climate change increases the risk of fisheries conflict", Marine Policy, 117:103954. https://doi.org/10.1016/j.marpol.2020.103954. Jul. 2020.

Miller, D. et al., "Cutting a lifeline to maritime crime: marine insurance and IUU fishing", Frontiers in Ecology and the Environment, 14(7):357-362. Jun. 2016.

Miller, N. et al., "Identifying global patterns of transshipment behavior", Frontiers in Marine Science, 5:240. Jul. 2018. DOI: 10.3389/fmars.2018.00240 (9 pages).

Monk, C. et al., "How ecology shapes exploitation: a framework to predict the behavioural response of human and animal foragers along exploration-exploitation trade-offs", Ecology letters, 21(6):779-793. OI: 10.1111/ele.12949 (15 page).

Osterblom, H. et al., "Global cooperation among diverse organizations to reduce illegal fishing in the Southern Ocean", Conservation biology, 26(4):638-648. May 2012. DOI: 10.1111/j.1523-1739.2012.01850.x.

Patroumpas, K. et al., "Online event recognition from moving vessel trajectories", GeoInformatica, 21(2):389-427. Aug. 16, 2016. DOI: 10.1007/s10707-016-0266-x (35 pages).

Pauly, D. et al., "Catch reconstructions reveal that global marine fisheries catches are higher than reported and declining Catch reconstructions reveal that global marine fisheries catches are higher than reported and declining", Nature communications, 7:10244 Jan. 19, 2016. (9 pages).

Pramod, G. et al., "Estimates of illegal and unreported fish in seafood imports to the USA", Marine Policy, 48:102-113. 2014. (12 pages).

Rosenthal, S. et al., "Revealing the hidden networks of interaction in mobile animal groups allows prediction of complex behavioral contagion", Proceedings of the National Academy of Sciences, 112(15):4690-4695 Mar. 2015. (6 pages).

Sabatini, M. et al., "Spring plankton communities in the southern Patagonian shelf: Hydrography, mesozooplankton patterns and trophic relationships", Journal of Marine Systems, 94:33-51. Jun. 2012. pp. 33-51.

Samaila, U. et al., "Global scope and economics of illegal fishing", Marine Policy, 30(6):696-703. Nov. 2006. pp. 696-703.

De Souza, E. et al., "Improving fishing pattern detection from satellite AIS using data mining and machine learning", PloS one, 11(7):e0158248. 20 pages. https://doi.org/10.1371/journal.pone.0163760.

Tickler, D. et al., "Modern slavery and the race to fish", Nature communications, 9(1):4643. Nov. 7, 2018. (9 pages).

Watson, J. et al., "Fishermen follow fine-scale physical ocean features for finance", Frontiers in Marine Science, 5:46. doi:10.3389/fmars.2018.00046 (13 pages).

Worm, B. et al., "The future of fish", Trends in ecology & evolution, 27(11):594-599. Nov. 2012.

* cited by examiner

100

500

601

602

620

700

800

1100

1200

OPERATIONAL FORECASTING SYSTEM BASED ON ANOMALOUS BEHAVIORS IN COMPLEX SYSTEMS

CLAIM OF PRIORITY

This application claims priority to U.S. Provisional Application Ser. No. 63/027,651 filed May 20, 2020, titled "An Operational Forecasting system based on Anomalous Behaviors in Complex system," which is incorporated by reference in its entirety.

GOVERNMENT INTEREST STATEMENT

This invention was made with support from the United States Government under Grant No. 80NSSC19K0203 awarded by National Aeronautics and Space Administration. The Government has certain rights in the invention.

BACKGROUND

For many complex systems, large and abrupt changes can occur. For example, financial markets can crash, power grids can blackout, pandemics can spread. In these cases, systemic change starts small, happening locally, but then spreading throughout the system. Often the actors that start the fire cannot be seen (invisible actors), and there is a pressing need to 1) identify these sparks early, and 2) make operational forecasts based upon these early warning signals, so that relevant authorities can intervene to either reverse the change or mitigate the damage before the opportunity for systemic effects occurs.

This need to identify (or detect) and forecast (or predict) the likely actions of invisible actors are evident with a simple example, illegal activity at sea, such as illegal, unreported, and unregulated fishing (IUU), drug running, etc. To concentrate on illegal fishing, for example, this illegal activity occurs offshore throughout the globe, with dire consequences to fishing ecology, harming the environment, law-abiding fishers, lost tax revenue to local governments, and even geopolitical disruption. Governments and law enforcement have attempted to prevent or deter illegal fishing by responding to reported instances, monitoring known areas with high traffic of illegal activity, and large operations that monitor and target specific areas. However, these attempts by government and law enforcement can be somewhat random or done with limited knowledge, so outcomes may not be ideal. Advance knowledge of these events broadcasted to invisible illegal actors will allow them to evade enforcement, further undermining governments, and law enforcement.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
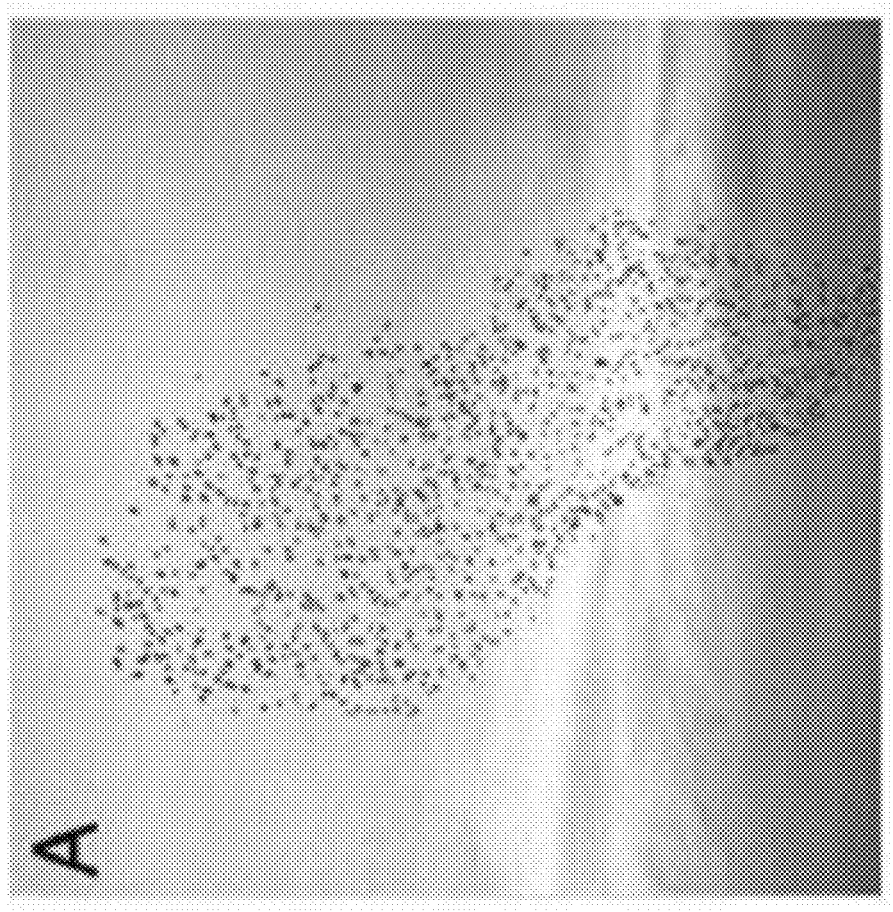
FIG. 1 illustrates a picture where birds move together in a coordinated pattern.

Currently, illegal activities at sea are detected forensically (i.e. after they have happened) using the following techniques: 1) spoofing detection; 2) trans-shipment detection; and 3) machine-learning classification. In approach #1, spoofing refers to ocean vessels intentionally turning off, scrambling, and/or falsifying their GPS transponder or data, which has been assumed to indicate illegal activity. This methodology successfully identifies illegal activities in a number of case studies. However, spoofing detection is limited, specifically, it is only ever inferential (and does not confirm the occurrence of illegal activity) and it is always retroactive, revealing anomalous activities after they have occurred. Thus, identifying illegal activities after the event has taken place can only help forensic responses by coast guards, and not preventative actions.

In approach #2, trans-shipment refers to fishing vessels offloading their catch to another vessel while at sea, which is also indicative of illegal activity. To detect trans-shipment events, recent advances that utilize high-resolution satellite imagery identify how close and how long two vessels are to one another. Again, this approach relies on identifying vessels one at a time and happens almost always retroactively. The approach does not provide predictions of where illegal activity is likely to occur, only that it did occur.

In approach #3, machine-learning algorithms are used to classify whether a fishing vessel is fishing illegally or not, given its location at a specific time. This approach uses vessel location data to estimate, based on historical data, if and when a vessel is fishing or not, and if they are permitted to do so. This approach may have near real-time capability but does not truly predict instances of illegal activity, in the sense of an operational forecast, rather it simply classifies whether a vessel is fishing or not at a given time.

The example of illegal activity at sea nicely illustrates the importance of detecting and predicting (and then preventing and intervening). Given this example, it might not be obvious that there are numerous other (seemingly unrelated) systems that also suffer from inability of humans to identify (detect) and forecast (predict) the actions of invisible actors. Some examples are described below.

Financial market crashes: Dramatic declines in stock prices can cause panic within financial markets that can lead to financial market crashes. These crashes can be a result of idiosyncratic uncertainty causing short-run declines (flash crashes) or due to underlying economic factors that can cause long-run impacts (recessions). As a result, individuals in an economy are impacted through job loss and declines in investments and retirement portfolios. Financial crashes are hard to detect and predict because disentangling the many relationships that drive financial markets is extremely complex. Similar to predicting illegal activities at sea described above, financial crashes can contain anomalous precursor signals, based on the interaction of stocks, that can be detected in which a sector-based perturbation can originate (as happened, for example, in the 2007-2008 crash of the housing market) followed by rapid transmission into global markets (resulting in some cases with a financial crash). Operational forecasts of financial crashes will be of value to investors (e.g. for use in hedge instruments) and governments looking to slow down and/or stop crashes.

Prison riot: Prisons are tightly controlled areas where prison guards need to respond quickly to disturbances such as riots. Prison riots precipitate rapidly and emerge from the behavior of a few prisoners. It is hard to predict or detect which prisoners are likely to incite a riot and when their actions or omissions might predict precipitation into riot conditions. As a result, prison guards respond with minimal to no warning that puts them at risk as well as the prisoner population. The ability to detect and/or predict these disturbances within a prison population will allow prison guards to preempt a disturbance or provide them with an early warning system so they can intervene in a strategic way.

Active shooter situation: Active shooter events occur at a moment's notice that is, for the most part, undetectable. When these emergencies arise, law enforcement often has very inadequate information about where to intervene-when to go where. Obviously, everyone in the shooter's path suffers, whether through bullets or through emotional scarring. Law enforcement becomes aware of an active shooter through an emergency response system (e.g., 911 call) so their actions are meant to intervene to mitigate harm to individuals. Law enforcement can find itself helpless, until by luck and persistence, it catches up to the shooter to suppress the damage. More often than not, law enforcement is responding to an active shooter event that has already occurred. Were it possible to detect or predict the location of the shooter, law enforcement could intervene sooner and in a more efficient manner.

Compromise in cyber- and power-systems: Compromised cyber-intrusions of computer systems can happen at any time and on any system. As technology increases, cyber-intrusions become harder to defend against and detect. Individual's computers can become compromised and their information stolen, businesses and governments may be held at ransom to regain control of their computer systems, and entire power-systems can be compromised and shut down, causing panic among society. It is well understood that prior to an intrusion event, cyber-criminals typically probe systems for security holes. This probing activity by an invisible actor occurs outside of normal behavior on the system. Security experts attempt to monitor systems by looking for unusual activity and/or access requests. The ability to make operational forecasts that can detect or predict likely cyber-intrusion events will allow system administrators to know an attack is likely to occur so they can prepare.

Various embodiments provide a general-purpose approach to solving the core problems of detecting and predicting the actions of invisible actors, and the consequential challenges of intervention and prevention. The embodiments are explained with reference to illegal activity at sea. However, the embodiments are applicable to other situations. For example, the embodiments are applicable to the situations discussed above with reference to financial market crashes, prison riots, active shooter situation, compromise in cyber- and power-systems, etc. Some embodiments comprise an operational forecasting system for an application to data gathered from complex systems. The operational forecasting system uses novel early-warning signals that are based on anomalous behaviors of actors or agents that are observed, as they respond to those unobserved actors that are the source of systemic change.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a logical unit. Any represented signal, as dictated by design needs or preferences, may actually comprise one or more signals that may travel in either direction, and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "real-time" here generally refers to systems that respond under real-time or live constraints and generate a result within a time frame (e.g., in few or less microseconds).

The term "module" or "logic" may refer to one or more passive and/or active components, or software components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about," generally refer to being within +/−10% of a target value.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

FIG. 1 illustrates picture 100 where birds move together in a coordinated pattern. Some embodiments provide a new operational forecasting system for application to data gathered from complex systems. This operational forecasting system uses novel early-warning signals that are based on anomalous behaviors of actors or agents that are observed, as they respond to those unobserved actors that are the source of systemic change. This behavior is prevalent in the natural world through animal flocking patterns or murmuration.

Murmurations refer to a phenomenon where groups of animals move together in a coordinated pattern. Within the murmuration, the animals respond to small disturbances that propagate throughout the system. For example, starling birds exhibit murmuration behaviors as they fly together (as shown in FIG. 1). If a predator enters the system and moves to attack a single bird, the response by the single bird is seen by other birds, so they respond in a similar manner which then spreads through the system. Other murmurations include schools of fish or swarms of insects.

Some embodiments provide an operational forecasting system to solve the problem of predicting illegal activities at sea using murmuration in maritime vessels. Many of the world's marine regions are experiencing an increase in illegal events, such as illegal fishing, which affects ecosystem integrity through harmful fishing practices, reduced economic development, and potentially increased geopolitical instability. Countries are trying to improve maritime law enforcement of their waters, but knowing when and where to enforce maritime laws comes at a significant cost in resources and time. Coastguards monitor and patrol large areas of the ocean to enforce the law of the sea, but the quality and volume of information they use about where and when to patrol can be low. Interestingly, while most efforts focus on detecting illegal activity, there currently exist no methods for predicting illegal activities in the oceans in near real-time or real-time. Operational forecasting system of various embodiments provides maritime law enforcement with a game-changing step-up in information for improved enforcement at sea.

The operational forecasting system of various embodiments target predicting when an event will occur before it does, based on the anomalous behaviors of observed actors responding to those invisible actors that are creating the perturbation (i.e., the murmuration). The prediction system of various embodiments can be used for predicting illegal activities at sea. Described here is how the operational forecasting system works in this context.

Consider the collective organization of vessels in an oceanic region. As vessels move about, they adhere to a system of spatial rules to accomplish their tasks. These vessels operate within a set of written and unwritten rules (e.g., fish over there, avoid collision with other boats, head to port after fishing, etc.) that allow them to function as a whole or fleet. Within a fleet, the spatial organization of vessels can be described as a network, and any one vessel's decision can change the structure of the network where nearby vessels respond to behaviors iteratively, thus producing contagion effects throughout the network.

In the context of illegal fishing, the spatial organization of a given fleet will act anomalously as an illegal event occurs (e.g., illegal fishing), and in fact even before the event starts. In the moments proceeding an illegal event, individual "good" vessels become aware of the bad actors preparing to commit the illegal activity, and they respond by moving away from the location of the event. This irregular behavior response is seen by other vessels, which iterates throughout the fleet. The structure of the fleet's network has now shifted away from normal operations. Embedded within that shift is a signal that indicates an illegal event is about to occur or is occurring.

The operational forecasting system of various embodiments applies a multiscale pattern analysis where systemic change will initially start locally, and then spread globally throughout the system. The operational forecasting system of various embodiments focuses on identifying early-warning signals of this multiscale contagion. In addition to multiscale pattern analysis, additional predictive information can be brought to bear, in particular environmental correlates can be used to infer when a system is ripe for systemic change. When combined, the accuracy of predictions increases.

Core Method: Multiscale Pattern Analysis: Today, the location of the majority of the world's maritime vessels are tracked through time. These vessel location data allow understanding of the spatial organization of fleets at a global scale and in near real-time. To quantify changes in the spatial behavior of entire fleets, based on individual-level location time series, some embodiments first calculate a relationship between vessels as simply their spatial distances from one another. For example, for a given time (e.g., an hourly time-point) for each vessel, the Haversine distance is calculated to all other vessels in the area. Over all vessels and for a given time, this results in an N×N Haversine distance matrix, where N is the number of vessels in the region. From this distance matrix, the next step computes a probability density function (PDF) using kernel density estimation. Over all time periods, this leads to a set of between-vessel distance PDFs, each summarizing the multiscale spatial organization of fishing vessels on the Patagonia shelf at a given time.

These between-vessel distance distributions (through time) hold an incredible amount of information that is used to develop spatial anomaly indices indicative of illegal activity. Some embodiments perform a retrospective analysis wherein for a given time period, between-vessel distance distribution is compared with those from a specific lagged time period. This lagged time period is dependent on two factors: 1) the inherent memory of the system; and 2) the typical timescale of illegal activities. The former factor relates to the fact that marine social-ecological systems are inherently non-stationary. As a consequence, an anomaly should be relative to a recent time period. The latter factor relates to the fact that if too short a timescale is chosen then a relatively prolonged period of IUU activity will be diagnosed as normal.

Once a lagged timescale is chosen, each between-vessel distance distribution is then compared with those from the lagged time periods. In some embodiments, this comparison is made using the Kolmogorov-Smirnov (KS) statistic, which measures the distance between two PDFs, but other metrics could be used, for example the Hamming distance or Kullback-Leibler divergence. The result is a set of (lagged) KS statistics for each time period. To summarize this lagged information, some embodiments compute various moments over these lagged sets, specifically mean and kurtosis. Both provide information about how anomalous a given time period is, relative to a recent time-period, based upon the geospatial organization of vessels in the region. The last step is used to compute the significance of these anomaly indexes. In some embodiments, the last step is performed by calculating the mean and kurtosis of lagged KS statistic sets for three null periods.

This approach to multiscale pattern analysis is successfully applied to make predictions of illegal fishing on the Patagonia Shelf, one of the world's most productive oceanic regions for fisheries.

Additional Method: Environmental Correlate Prediction Using Machine-Learning: In addition to the information the multiscale pattern analysis provides, machine-learning (ML) is used to classify whether a fishing vessel is operating legally or not, in accordance with some embodiments. Using remotely sensed oceanographic variables, as well as forecasts of these variables based on oceanic models, linked to vessel location data, machine-learning models (e.g. random forests) classify individual fishing vessels as operating legally or illegally at a given location and time. One strength of this method is its ability to predict hot spots based on forecasted changes in these oceanographic variables (i.e. the weather service provides weather forecasts, and similarly the Navy provides operational forecasts of the state of our oceans). Given a set of forecasted oceanographic variables, the machine-learning model is able to classify regions where illegal activity is likely to occur in the future.

An Operational Forecasting System: In some embodiments, the multiscale pattern analysis and the application of machine-learning can be combined into one system that provides maritime authorities with important information about the future state of their oceanic region, in terms of whether an illegal activity is expected to occur or not. While each of these methods can stand alone, combining the two methods provides new predictive abilities for anticipating illegal activity at sea, in accordance with some embodiments. For example, the application of machine-learning to forecasted oceanographic variables identifies illegal activity potential hot-spots. In these hot-spots, the multiscale pattern analysis algorithm is used to identify precursor signals of illegal activity.

By combining the two methods in this way, various embodiments enable maritime law enforcement to utilize resources more efficiently, because they can concentrate on monitoring resources on a specific area instead of patrolling an entire area. Upon prediction of likely illegal activity, maritime authorities can concentrate their efforts on a specific location(s) of interest. The methods of various embodiments provide entirely new predictive data analytics for pre-empting illegal activities at sea, globally, and in near real-time. This has immediate utility for marine law enforcement, conservation, and fisheries management.

Figure 2:
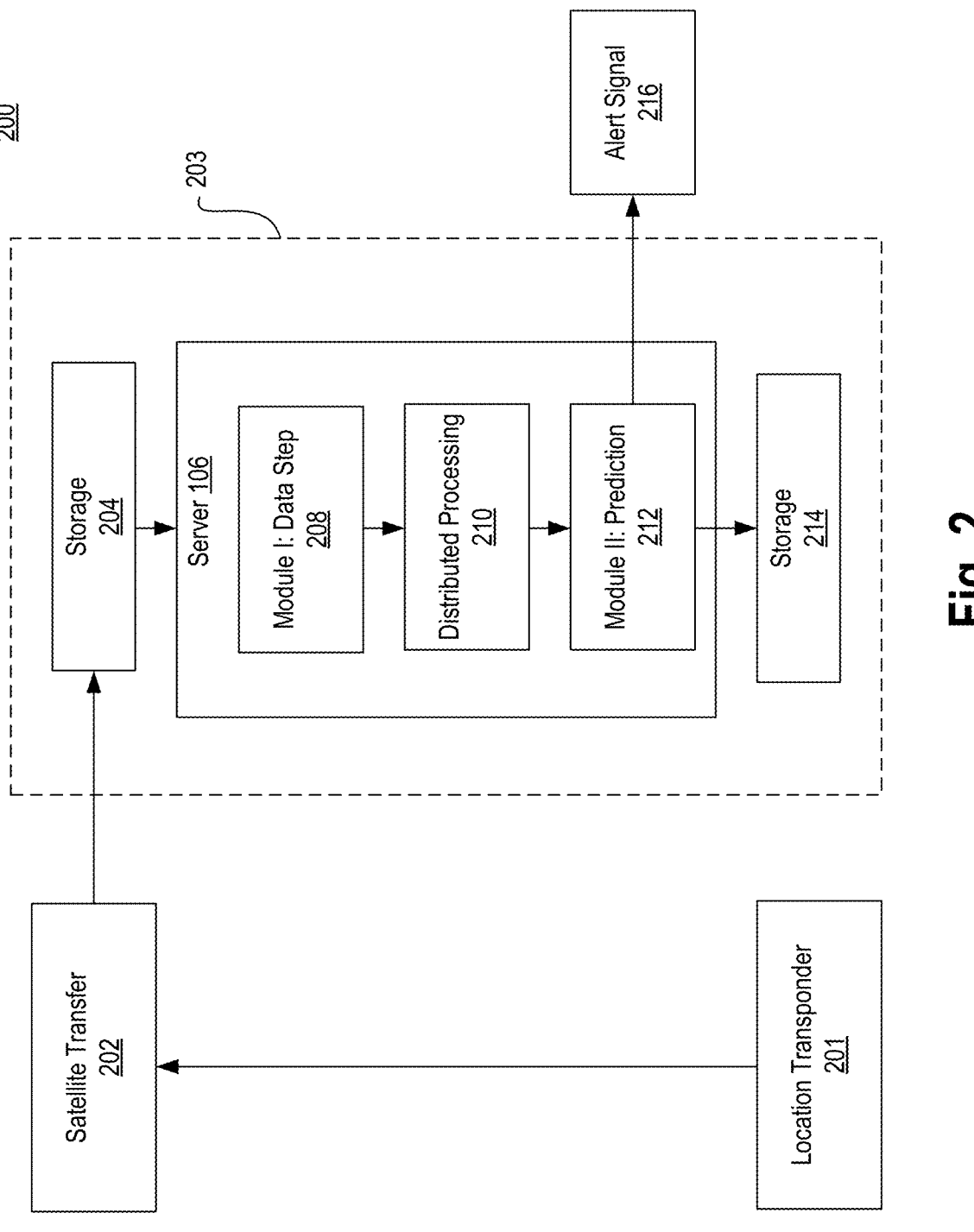
FIG. 2 illustrates a flowchart for predicting illegal activities at sea using information architecture for application of the operational forecasting system, in accordance with some embodiments.

FIG. 2 illustrates system 200 for predicting illegal activities at sea using information architecture for application of the operational forecasting system, in accordance with some embodiments. Arrows between the various components of system 200 may not limit the embodiments to a particular path of action. Some components perform certain processes in a sequence while some components may perform certain processes simultaneously. The various components include hardware, software, or a combination of them. In some embodiments, system 200 comprises location transponder 201, satellite 202, and circuitry 203. In various embodiments, circuitry 203 includes storage 204 (e.g., volatile or non-volatile memory), server 106 (e.g., a computing terminal, cloud-based server, public server, private server, or local server, etc.), and storage 214 (e.g., volatile or non-volatile memory). In some embodiments, storages 204 and 214 may be combined into a single storage unit. In some embodiments, server 106 includes hardware and/or software for operational forecasting. For example, server 106 includes hardware and/or software for processing data. This process can be performed by module 1 or circuitry 208. In some embodiments, server 106 includes hardware and/or software 210 for distributed processing. Such hardware and/or software 210 (or distributed processing circuitry) can be used for dividing a task or process into multiple sub-tasks or sub-processes and to send them out to other computing resources (e.g., other servers or computers) for processing and then compiling the processes data. In some embodiments, server 106 includes hardware and/or software (herein Module II or circuitry 212) to process data and to predict.

In some embodiments, vessel transponder 201 records the location of the vessel at defined time step and uploads to satellite 202 to transfer to secure memory of storage 204. In some embodiments, server 106 receives a response from storage 204 that new location data is available. In some embodiments, Module I 208 provides a data step that processes and cleans the data through a distributed process. In some embodiments, after distributed processing from hardware and/or software 210, Module II or circuitry 212 provides a prediction algorithm from either a Core Method or an Additional Method. In some embodiments, depending on the method, a decision is made and an Alert signal 216 is sent if requirements for the decision are met. In some embodiments, all data and modules are saved in secure storage 214.

System 200 can be generalized for predicting illegal activities in any media using information architecture for application of the operational forecasting system, in accordance with some embodiments. In one such embodiment, system 200 includes an apparatus comprising storage 204 and/or 214 to store records of locations of objects received from another device; and processor circuitry of server 106 coupled to storage 204 and/or 214. In some embodiments, processor circuitry of server 106 executes one or more instructions to predict illegal activities. In some embodiments, processing circuitry of server 106 processes the received records by application of a distributed process; applies a prediction scheme on the processed records to identify an anomaly behavior among the objects; and issues an alert if anomalous behavior is identified.

In some embodiments, to process the received record (e.g., transponder record), processor circuitry of server 106 calculates pairwise nearest neighbor Haversine distances of the objects in a region. Processing circuitry of server 106 then calculates, for a time period, probability density functions of the pairwise nearest neighbor Haversine distances. In some embodiments, to apply the prediction scheme, processing circuitry of server 106 measures a distance between two probability density functions of the probability density functions. Thereafter, processing circuitry of server 106 computes mean and kurtosis of the distance. In some embodiments, the alert is issued if mean or kurtosis is greater than a threshold (e.g., a programmable threshold). In some embodiments, the threshold is substantially 95th percentile of a null distribution.

In some embodiments, to measure the distance between the two probability density functions, processor circuitry pf server 106 applies one of: Kolmogorov-Smirnov statistic, Hamming distance, or Kullback-Leibler divergence. In some embodiments, to process the received record, processing circuitry of server 106 identifies nearest predictors to locations of the objects to make predictions using real-time data or projections of future records, and applies a machine-learning model on the real-time data. In some embodiments, to apply the prediction scheme processor circuitry of server 106 classifies the vessels as illegal or legal operating vessels based on the application of the machine-learning model, and retrains the machine-learning model with results of the classification.

Figure 3:
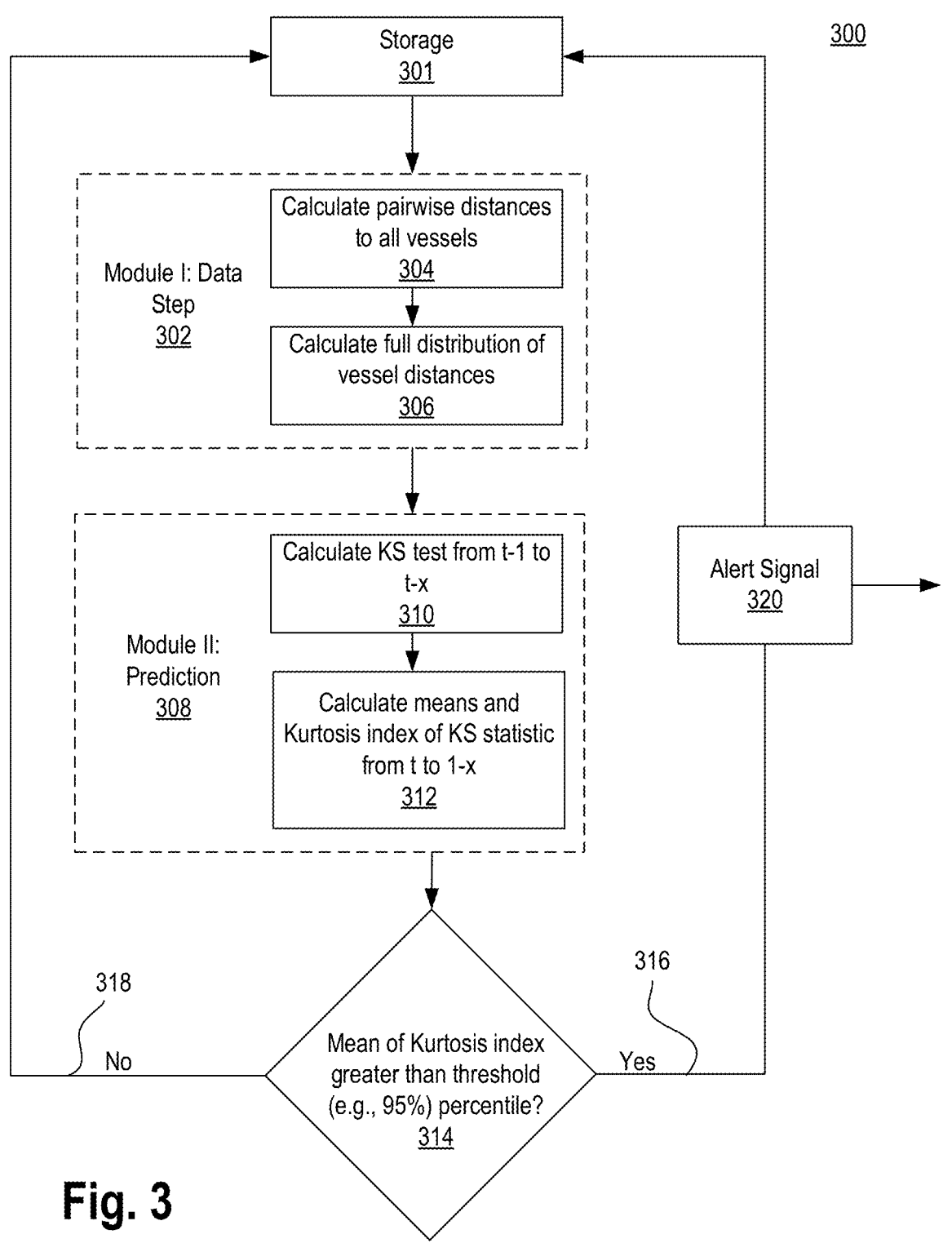
FIG. 3 illustrates a system for predicting illegal activities from multiscale feet patterns, in accordance with some embodiments.

FIG. 3 illustrates flowchart 300 using system 200 for predicting illegal activities from multiscale feet patterns, in accordance with some embodiments. While various blocks are shown in a particular order, the order can be modified. For example, some blocks may be performed before others while other blocks may be performed simultaneously. The blocks of flowchart 300 can be performed by hardware, software, or a combination of them. Flowchart 300 provides data information for the application of the Core Method—multiscale pattern analysis—for predicting illegal activities at sea.

At block 301, the system receives updated vessel location data (AIS, VMS) at time interval t from secure memory of storage 204. For example, vessel transponder 201 records the location of the vessel at defined time step and uploads to satellite 202 to transfer to secure memory of storage 204. At block 302, Module I 208 provides a data step that first calculates pairwise nearest neighbor Haversine distances (km) for all vessels in a specified region. The calculation of pairwise distances of all vessels is performed at block 304. The calculation of full distribution of vessel distances is performed at block 306. For example, at block 306, Module 1 208 calculates the cumulative distribution for the current period t and t–1 . . . t–x, where x is a chosen lagged period (e.g., 1 week).

At block 308, Module II or circuitry 212 provides a prediction method that first calculates Kolmogorov-Smirnov Test for the current period, t, and all other lag periods, t–1 . . . t-x. the process of calculating the KS test is performed at block 310. At block 312, Module II or circuitry 212 calculates mean and kurtosis of the lagged Kolmogorov-Smirnov Test statistics. At block 314, a determination is made regarding mean or kurtosis index relative to a threshold. If mean or kurtosis is greater than a threshold (e.g., 95th percentile) of the test (null) distribution (316) then an alert signal (320) is sent and data is stored in storage 214.

Thereafter, the flowchart waits for new vessel location data to be received and saved in storage 204 as indicated by block 301. If mean or kurtosis index is less than or equal to the threshold, then the process proceeds to block 301 as indicated by path 318 where the flowchart saves the data in storage 214 and waits for new vessel location data.

Figure 4:
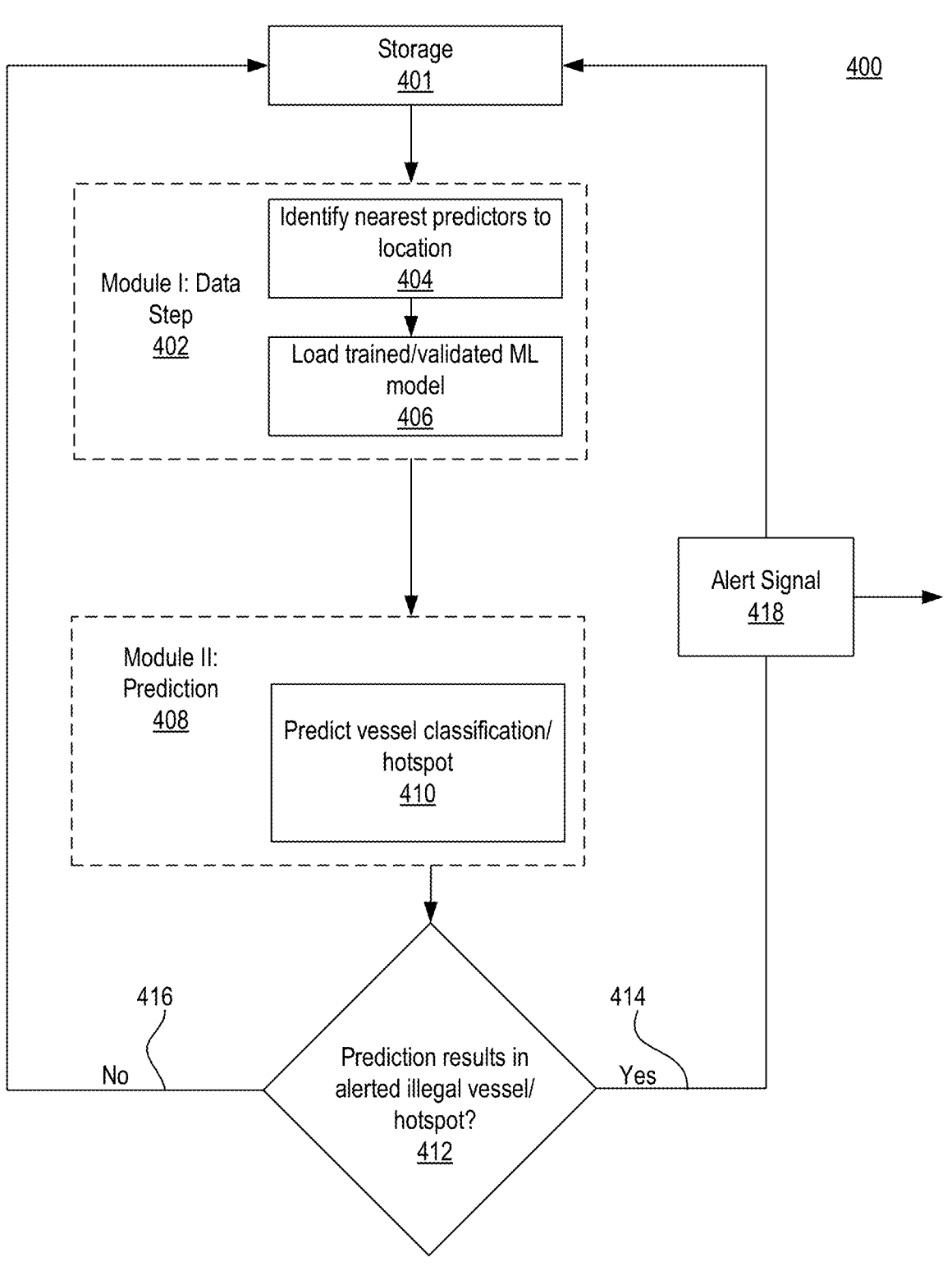
FIG. 4 illustrates a flowchart of machine-learning on projected environmental correlates for predicting illegal activities at sea, in accordance with some embodiments.

FIG. 4 illustrates flowchart 400 of machine-learning (ML) on projected environmental correlates for predicting illegal activities at sea, in accordance with some embodiments. While various blocks are shown in a particular order, the order can be modified. For example, some blocks may be performed before others while other blocks may be performed simultaneously. The blocks of flowchart 300 can be performed by hardware, software, or a combination of them. Flowchart 400 is an information architecture for the application of the Additional Method—application of machine-learning on projected environmental correlates—for predicting illegal activities at sea.

At block 401, the system receives updated vessel location data (AIS, VMS) at time interval t, from storage 204. For example, vessel transponder 201 records the location of the vessel at defined time step and uploads to satellite 202 to transfer to secure memory of storage 204. At block 402, Module I 208 provides a data step that identifies the nearest predictors to the vessel's location to make predictions using real-time data or projections of future data, such as oceanographic variables (e.g. sea surface temperature, chlorophyll, and seascapes). The identification of nearest predictors is made at block 404. At block 406, Module I 208 loads the trained and validated machine-learning model to either classify vessels or identify hotspots. At block 408, Module II or circuitry 212 provides the prediction of the classification or hotspot location. Here, the prediction of the classification or hotspot location is performed by block 410, a process within Module II or circuitry 212. Upon validation, data is used to retrain the model to improve prediction accuracy. At 412, a determination is made regarding whether the prediction results in detection of illegal fishing vessels or predicts a likely hotspot. If the prediction results in detection of illegal fishing vessels or predicts a likely hotspot, the process proceeds to path 414 where an alert is sent at block 418 and data is saved in storage 204. If the prediction does not result in detection of illegal fishing vessels or does not predict a likely hotspot the process takes path 416 and data is saved in storage 204, and the process waits for new location response.

Figure 5:
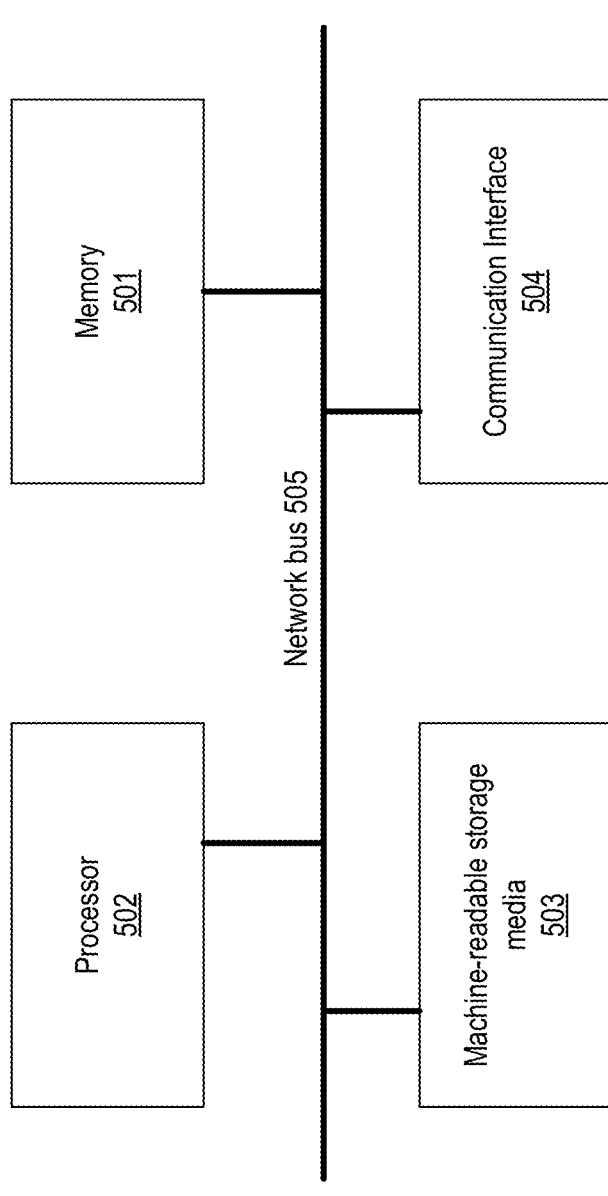
FIG. 5 illustrates an operational forecasting system based on anomalous behaviors in complex systems, in accordance with some embodiments.

FIG. 5 illustrates an operational forecasting computer system 500 based on anomalous behaviors in complex systems, in accordance with some embodiments. Elements of embodiments are also provided as a machine-readable medium (e.g., memory) for storing the computer-executable instructions (e.g., instructions to implement any other processes discussed herein). In some embodiments, operational forecasting computing system 500 comprises memory 501, processor 502, machine-readable storage media 503 (also referred to as tangible machine readable medium), communication interface 504 (e.g., wireless or wired interface), and network bus 505 coupled together as shown.

In some embodiments, processor 502 is a Digital Signal Processor (DSP), an Application Specific Integrated Circuit (ASIC), a general-purpose Central Processing Unit (CPU), or a low power logic implementing a simple finite state machine to perform the method of various embodiments, etc.

In some embodiments, the various logic blocks of operational forecasting computing system 500 are coupled together via network bus 505. Any suitable protocol may be used to implement Network Bus 505. In some embodiments, machine-readable storage medium 503 includes instructions (also referred to as the program software code/instructions) for operational forecasting system based on anomalous behaviors in complex systems as described with reference to various embodiments and flowcharts.

Program software code/instructions associated with the flowcharts (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with the flowcharts (and/or various embodiments) are executed by operational forecasting computing system 500.

In some embodiments, the program software code/instructions associated with the flowchart(s) (and/or various embodiments) are stored in a computer executable storage medium 503 and executed by processor 502. Here, computer executable storage medium 503 is a tangible machine-readable medium that can be used to store program software code/instructions and data that, when executed by a computing device, causes one or more processors (e.g., processor 502) to perform a method(s) as may be recited in one or more accompanying claims directed to the disclosed subject matter.

In some embodiments, computer executable storage medium 503 includes machine readable instructions that, when executed, cause one or more machines to perform a method comprising receiving records of locations of objects (e.g., vessels, prisoners, financial stock information, birds, etc.). The method further comprises storing the received records in memory (e.g., volatile or non-volatile memory). In some embodiments, the method comprises processing the received records by applying a distributed process. In some embodiments, the method comprises applying a prediction scheme on the processed records to identify an anomalous behavior among the objects. The method further comprises issuing a notification if an anomalous behavior is identified.

In some embodiments, processing the received record comprises calculating pairwise nearest neighbor Haversine distances of the objects in a region; and calculating, for a time period, probability density functions of the pairwise nearest neighbor Haversine distances. In some embodiments, applying the prediction scheme comprises: measuring a distance between two probability density functions of the probability density functions; and computing mean and kurtosis of the distance. In some embodiments, the notification is issued if the mean or kurtosis is greater than a threshold. In some embodiments, the threshold is substantially 95th percentile of a null distribution. In some embodiments, the threshold is programmable. In some embodiments, measuring the distance between the two probability density functions comprises applying one of: Kolmogorov-Smirnov statistic, Hamming distance, or Kullback-Leibler divergence.

In some embodiments, processing the received records comprises: identifying nearest predictors to locations of the objects to make predictions using real-time data or projections of future records; and applying a machine-learning model on the real-time data. In some embodiments, applying the prediction scheme comprises: classifying the objects as illegal or legal operating objects based on the application of the machine-learning model; and retraining the machine-learning model with results of the classification. In some embodiments, the notification is issued if the classification of the objects provides a prediction of an illegal operating object. In some embodiments, the records of locations of objects are received via a satellite.

The tangible machine readable medium 503 may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer-to-peer networks and the like, including the Internet. Different portions of the software program code/instructions and data can be obtained at different times and in different communication sessions or in the same communication session.

The software program code/instructions (associated with the flowchart(s) and other embodiments) and data can be obtained in entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. It is not required that the data and instructions be on a tangible machine readable medium in entirety at a particular instance of time.

Examples of tangible computer-readable media 503 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical, or other forms of propagating signals, such as carrier waves, infrared signals, digital signals, etc., through such tangible communication links.

In general, tangible machine readable medium 503 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Android®, or the like, or any other device including a computing device. In one embodiment, a processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

As an example, the multiscale pattern analysis algorithm is tested on vessel location data from the Patagonian shelf region off the coast of Argentina, an important fishing region with chronic exposure to illegal activity. Mean and kurtosis anomaly indices provided early-warning of a number of illegal recent events on the Patagonian shelf. We refer the reader to the following article for more information about the success of the multiscale pattern analysis algorithm: arxiv.org/abs/1910.05424.

A Random Forest algorithm is developed for the Patagonian shelf region to predict illegal fishing in the region. Oceanographic variables associated with fishing-sea surface temperature, chlorophyll, and oceanic seascapes-were used to make predictions about whether a given vessel was fishing illegally or not. The example focused on predicting illegal fishing by distant water fishing (DWF) vessels, which are not allowed to fish in the Argentine sovereign waters. DWF vessels are defined as those not flagged to the adjacent coastal state of Argentina. The machine-learning algorithm of various embodiments predicted illegal fishing committed by DWF vessels with an accuracy of 75% to 90%, depending on the year.

The embodiments are applicable to outside illegal activity at sea. As mentioned herein for the purpose of concrete illustration, the description concentrated on applying the embodiments to the case of illegal activity at sea. However, there are many natural systems that exhibit the murmuration properties. Consider the following examples where there are sources of information to detect murmuration, which our invention then translates to better detection, prediction, intervention, and prevention.

Financial market crashes: Similar to predicting illegal activities at sea described herein, financial crashes can contain anomalous precursor signals, based on the interaction of stocks that can be detected by perturbation originating (e.g., for the 2007-2008 housing market crash) and used to predict a financial crash. These perturbations become visible when behaviors outside of normal operations occur. To illustrate this idea in the context of illegal activity at sea, consider stock traders instead of fishing vessels. During normal daily operations, traders will respond to new information by trading on stocks and other traders will respond to their neighbor's actions. Some embodiments can measure the distance (in time) between stock trades by traders in different industries and how other traders respond, collectively. In the case of a financial market crash, when the distance between trades is sped up and more focused on a specific industry, the behavior becomes abnormal (anomalous) which is different from normal operations, similar to fishing vessels responding to illegal fishing vessels. Applying the method of various embodiments to monitor sudden anomalous changes in behaviors among traders would allow for detecting whether a financial crash is imminent or predict the likelihood that a crash is in the future. Providing this information to governments would allow them to respond by preventing a likely crash or intervene to mitigate damage to an economy and individual's well-being.

Prison riots: The operational forecasting system of various embodiments provides early warning signals of riots through the analysis of anomalous spatial behaviors of individuals before a riot starts. Using cameras that track individuals' movements throughout the prison population allows the method to monitor normal behaviors and detect anomalous behaviors that may precede a riot. Measuring the distance between prisoners or monitoring the repulsion to other prisoners who are planning a riot are ways our method can apply in prisons. With the method of various embodiments, it is possible to detect unusual behaviors that make it possible to predict a likely riot.

Active shooter situation: Given spatial data on individuals (e.g., with cell phones, cameras, etc.), the operational forecasting system of various embodiments can provide early-warning signals that can detect an approaching active shooter and make predictions for their location as the event unfolds. This information will allow law enforcement to respond more quickly to events and allocate resources more efficiently.

Compromise in cyber- and power-systems: Computer systems are constantly being pinged for weaknesses that can be exploited; however, when a system is under attack these pings may become more frequent and spread out throughout the world where actors will hide their location. Given the timing and location of attacks on computer systems, the method of various embodiments can identify anomalous behaviors by measuring the frequency of attacks and locations against regular attacks. This information can provide important information to identify precursors that an attack on a computer system is imminent or predict when it might occur.

Various embodiments can be used for real-time Maritime Monitoring and Enforcement by: a) using data provided by regional maritime law enforcement, the scheme of various embodiments can be applied using vessel locations to identify anomalous behaviors and whether a vessel is operating legally or illegally in real-time; b) the scheme of various embodiments are able to send an alert to local law enforcement that vessels are acting unusually and provide a possible location of an illegal event; c) identify hot spots where illegal activity is likely to occur in the coming days; and d) as more data becomes available, the embodiments can improve the algorithm detection, alert signals, and possible type of activity that is occurring. The application of the operational forecasting system can be used for the following domains: a) predicting financial market crashes; b) prison riot prediction; c) active shooter detection/prediction; and d) detection of compromise in cyber- and power-systems.

Figure 6A:
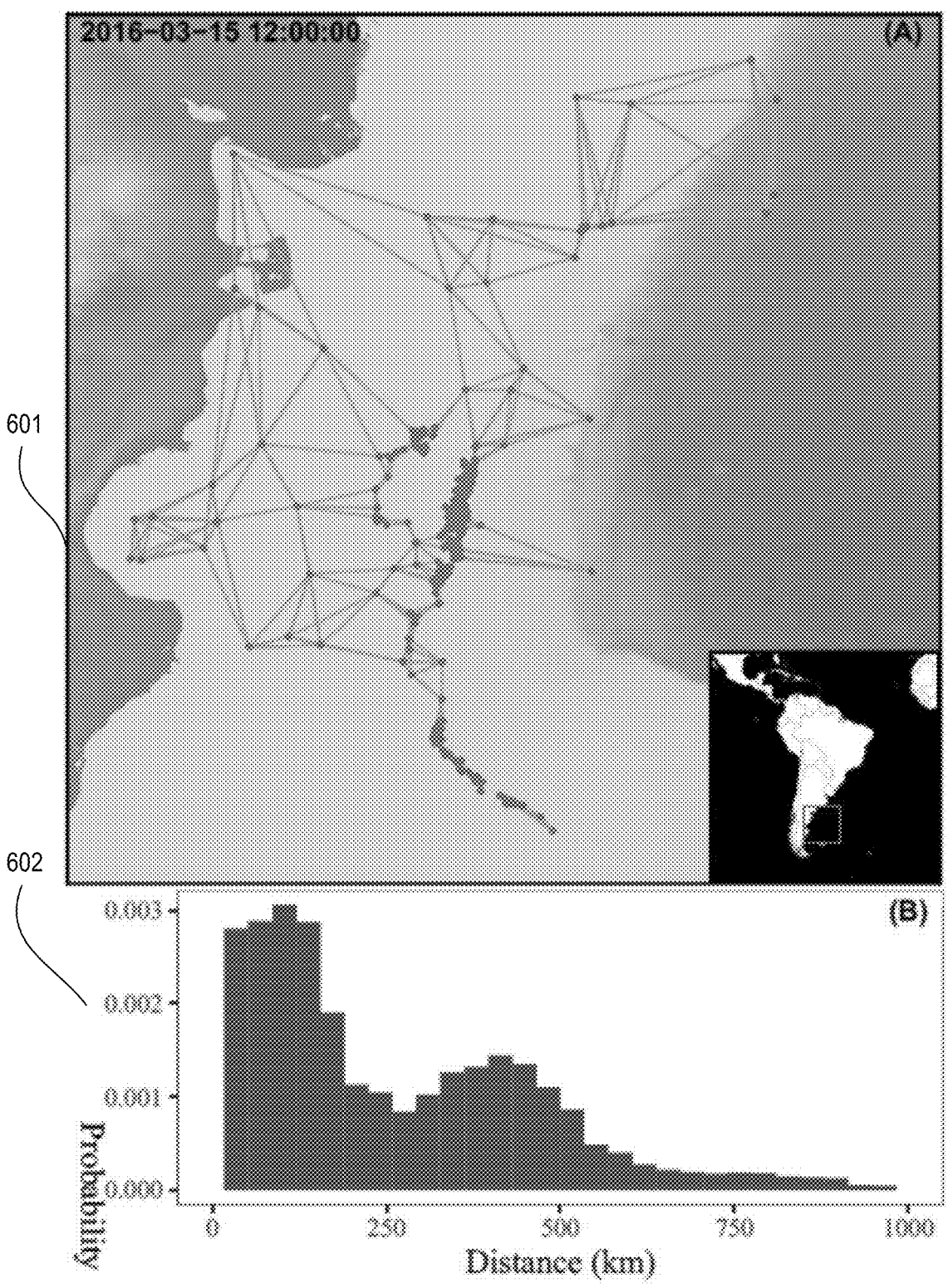
FIG. 6A illustrates a map of the Patagonia shelf and locations for each vessel with lines connecting nearest five neighbors.

FIG. 6A illustrates map 601 of locations for each vessel with lines connecting to the nearest five neighbors. Map 601 shows the location for each vessel on Mar. 15, 2016 at 12 PM, with lines connecting nearest five neighbors (chosen for visual clarity). This highlights the spatial network of interactions defining a complex fisheries system. Plot 602 below the map shows between-vessel distance distribution (km) for all vessels. These between-vessel distance distributions are used to characterize the multiscale spatial organization of fleets operating in this region. Essentially, changes in between-vessel distance distributions reveal illegal fishing (IUU) events.

Figure 6B:
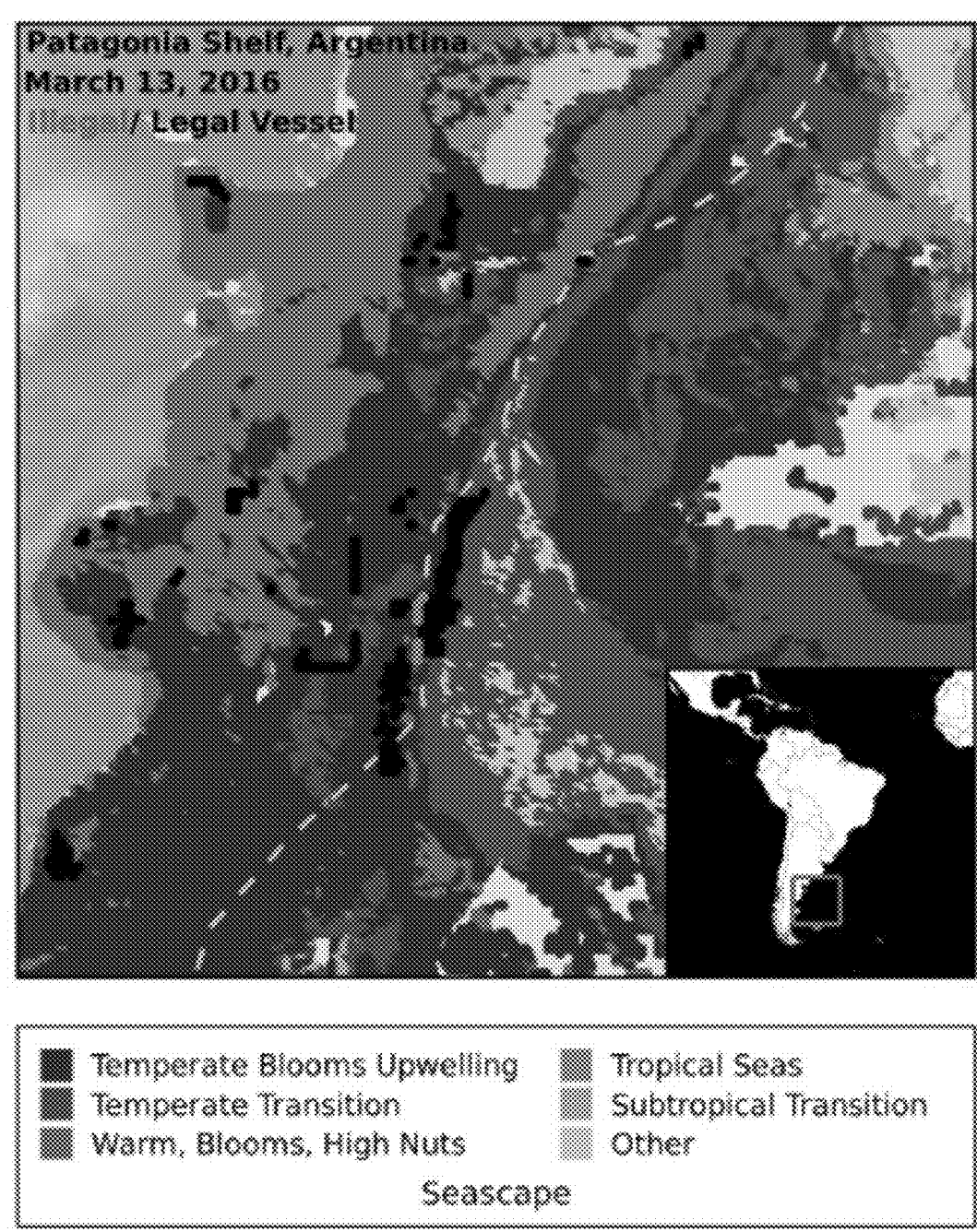
FIG. 6B illustrates a map of the Patagonian shelf with seascapes and illegal/legal fishing vessels.

FIG. 6B illustrates map 620 of the Patagonian shelf with seascapes and illegal/legal fishing vessels. The map of the Patagonian shelf region with the EEZ (orange dashed line), five most prevalent seascapes (colored in blue), and the location of vessels on Mar. 13, 2016. DWF vessels fishing illegally, i.e., within the Argentine EEZ, are highlighted by red markers.

Figure 7:
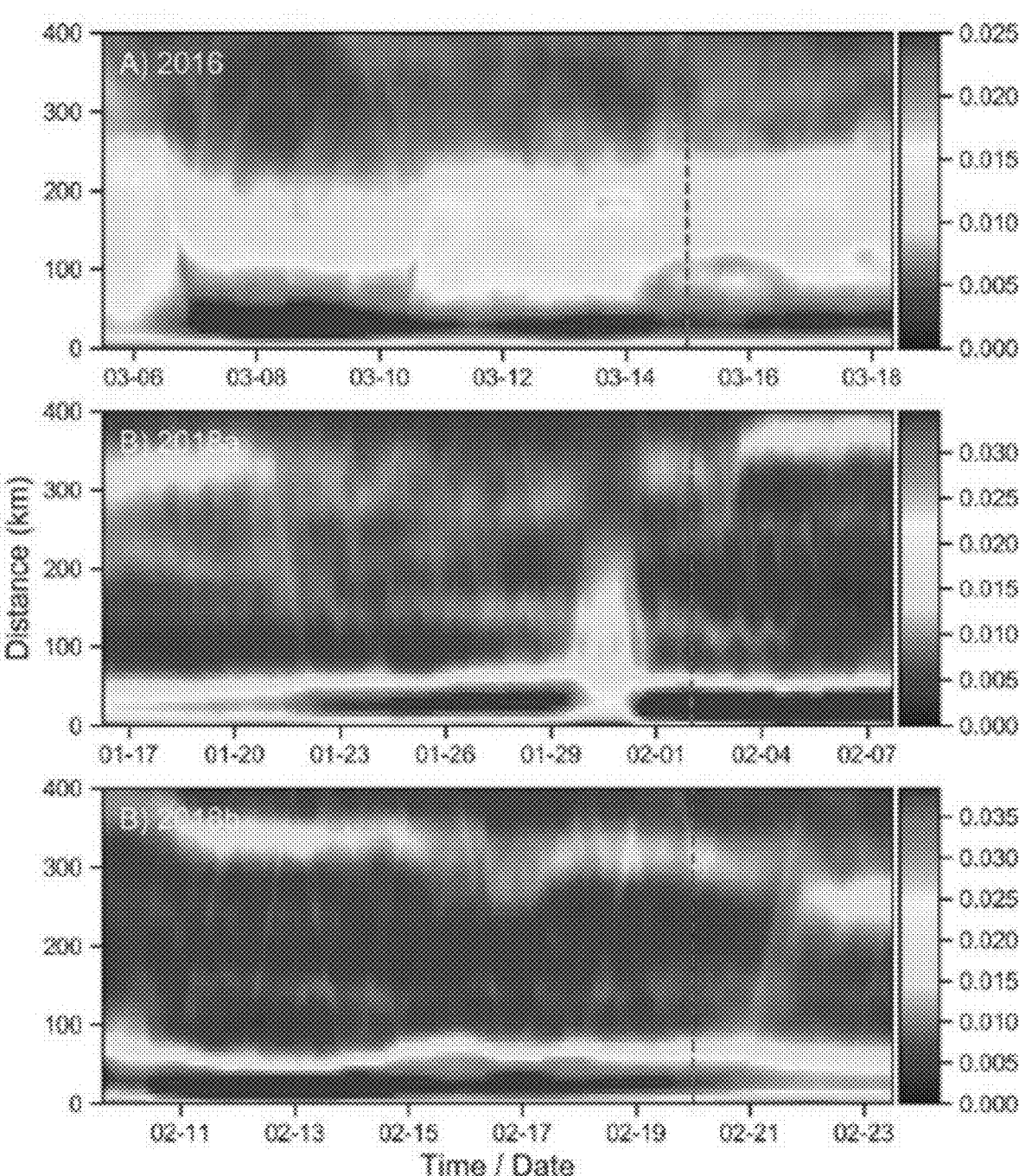
FIG. 7 illustrates pictures showing between-vessel distance probability density functions (color scale) through time for three time periods, where illegal fishing occurred on the Patagonian shelf.

FIG. 7 illustrates set of pictures 700 showing between-vessel distance probability density functions (color scale) through time for three time periods where illegal fishing occurred on the Patagonian shelf. Between-vessel distance probability density functions (color scale) through time for three time periods where illegal fishing occurred on the Patagonia shelf: 2016, 2018a, and 2018b. These between-vessel distance distributions have a distinct mode at short distances. This identifies the scale of local fleets in the region. But there exist other minor modes too, identifying smaller fleets operating in the region. Notably, these distributions change shape over time. These changes in the multiscale geospatial organization of vessels in the region can be used to identify anomalous behaviors indicative of illegal activities.

Figure 8:
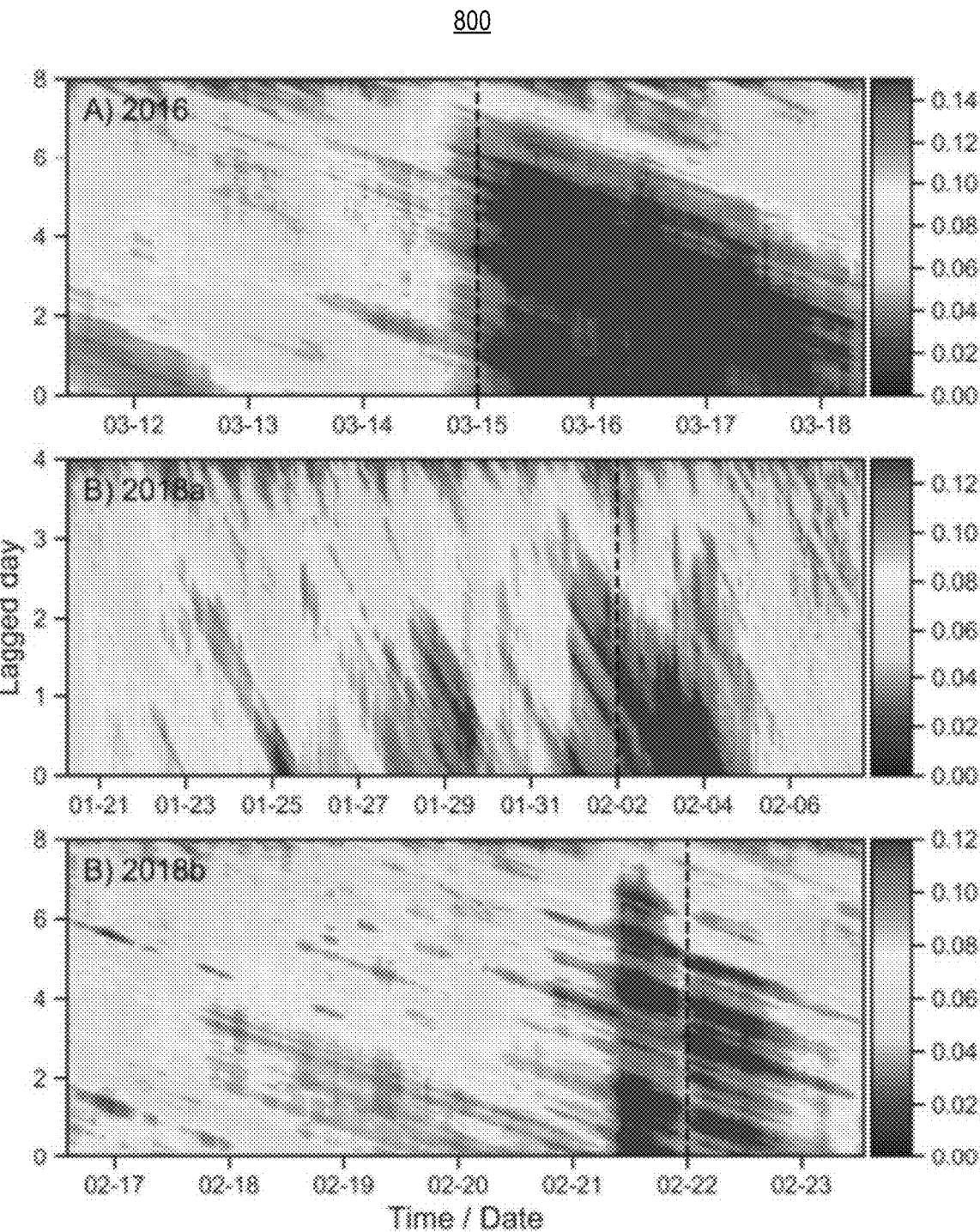
FIG. 8 illustrates pictures showing a moving window to compare a given time period, based on the between-vessel distance distribution (the horizontal axis) with those from a specific lagged period (the vertical axis).

FIG. 8 illustrates set of pictures 800 showing a moving window to compare a given time period, based on its between-vessel distance distribution (the horizontal axis) with those from a specific lagged period (the vertical axis). A moving window is used to compare a given time period, based on its between-vessel distance distribution (the horizontal axis), with those from a specific lagged period (the vertical axis). The comparison is made using the Kolmogorov-Smirnov (KS) statistic sets (i.e. the color scale). The KS statistic sets essentially capture how different a given time period is, based on the geospatial organization of vessels, compared to other lagged times. For each IUU event (black vertical lines), an increase in the lagged KS statistic set is observed. This highlights that the geospatial organization of vessels in and around an illegal activity is relatively anomalous.

Figure 9:
FIG. 9 illustrates plots of moments from the lagged Kolmogorov-Smirnov (KS) statistic sets, used to create anomaly indexes or indices.

FIG. 9 illustrates set of plots 900 of moments from the lagged KS statistic sets that can be used to create anomaly indices. Here, the mean lagged KS statistic is plotted over time. For each IUU event (vertical dashed lines) this anomaly index peaks immediately before, during, and after the events. Plots 900 includes plots 901, 902, and 903, when illegal fishing occurred on the Patagonia shelf: 2016, 2018a, and 2018b, respectively. "Significant" anomalous times (dot markers) are identified by comparing values to those created from null periods where IUU activities were suspected to not have occurred. These significant anomalies again all fall on the times when IUU events occurred, highlighting that this method can be used to identify when these kinds of events occurred. Importantly, precursor signals are observed, suggesting that predicting IUU activities may be possible.

Figure 10:
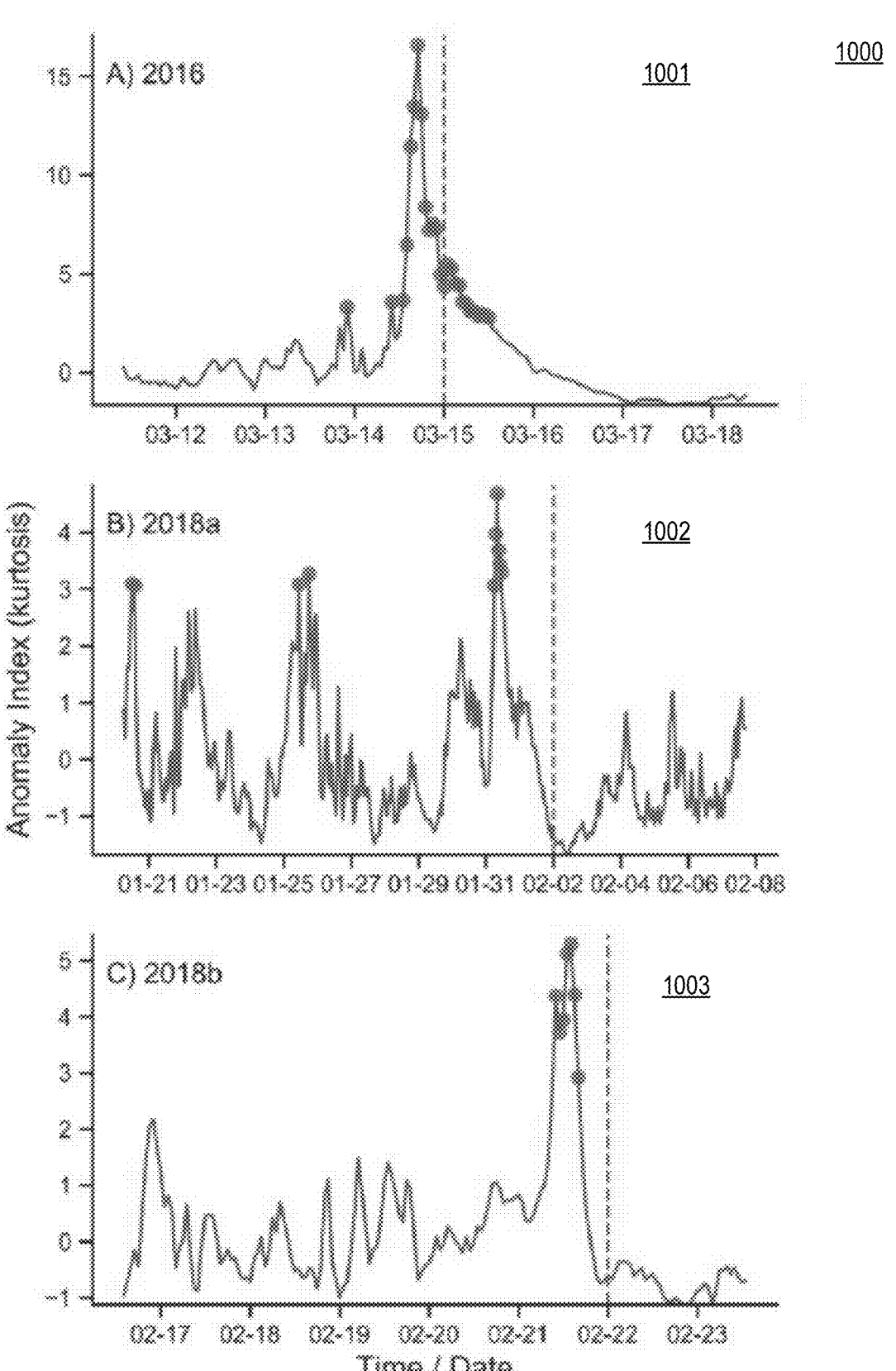
FIG. 10 illustrates plots of moments from the lagged KS statistic distributions, which can be used to create anomaly indexes.

FIG. 10 illustrates plots of moments from the lagged KS statistic distributions that can be used to create anomaly indices. Plots 900 includes plots 1001, 1002, and 1003, when illegal fishing occurred on the Patagonia shelf: 2016, 2018a, and 2018b, respectively. Here, the kurtosis of the lagged KS statistic sets is plotted over time. "Significant" anomalous times (red markers) are identified by comparing values to those created from null periods where IUU activities were suspected to not have occurred. This anomaly index reveals strong precursor signals before all IUU events. This signal may be indicative of the naval/coast-guard intervention, but potentially more powerful, it may also be indicative of IUU activity itself.

Figure 11:
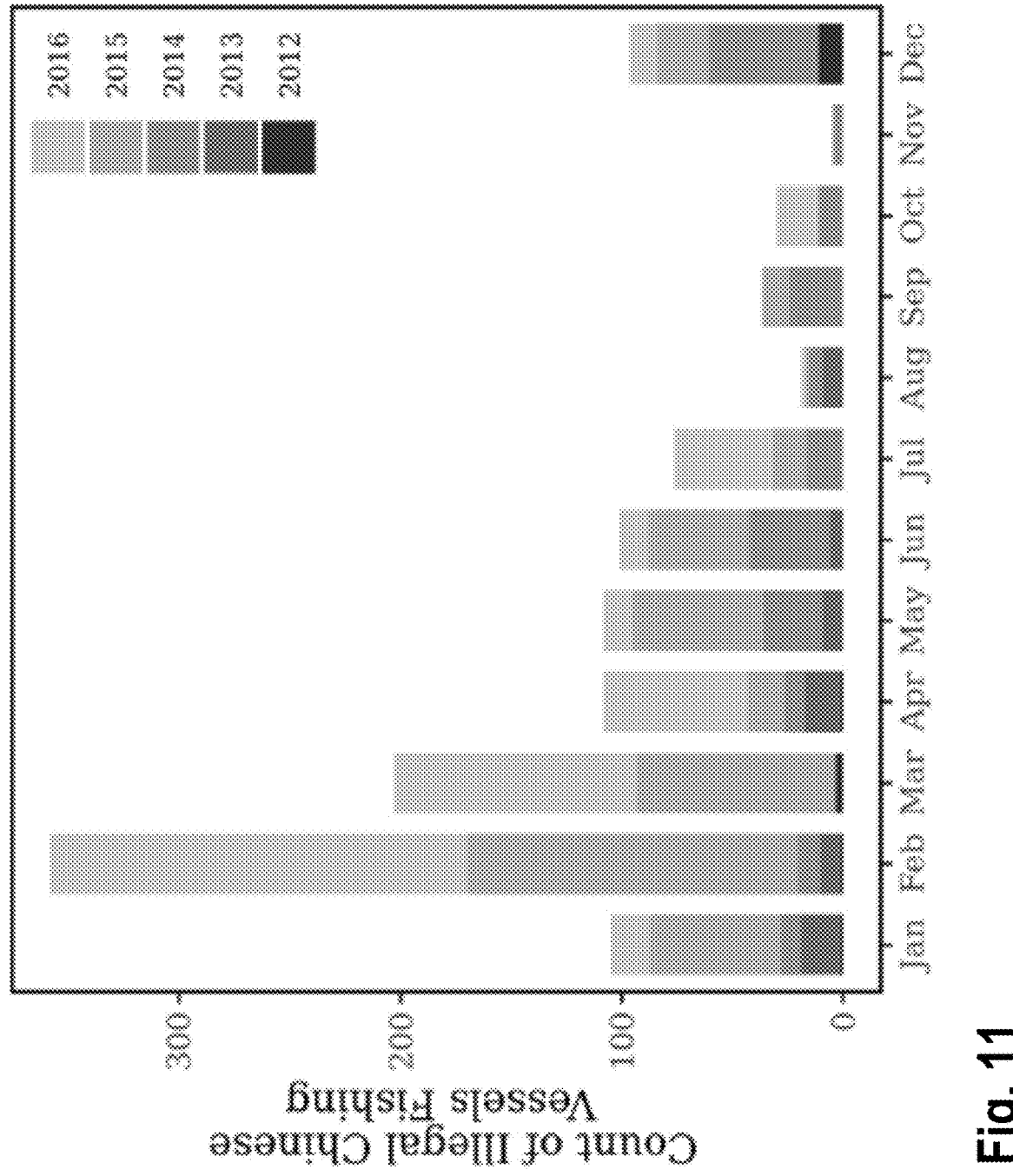
FIG. 11 illustrates a plot showing the number of illegal events per month and year in the Patagonian shelf.

FIG. 11 illustrates plot 1100 showing a number of illegal events per month and year in the Patagonian shelf. The majority of illegal DWF fishing occurs in February and March when the squid fishery is most active.

Figure 12:
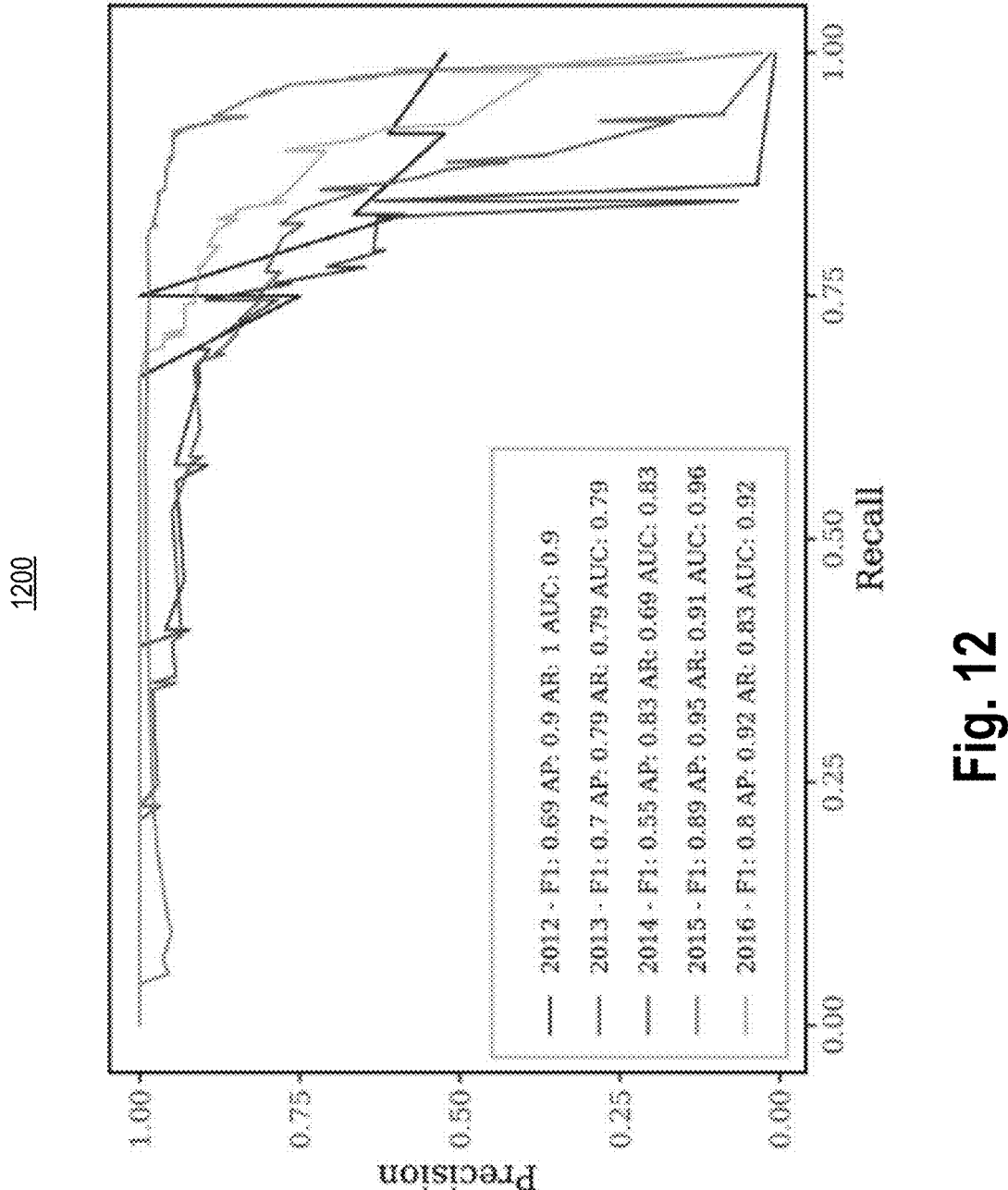
FIG. 12 illustrates a precision-recall plot using random forest classifier with all variables.

FIG. 12 illustrates precision-recall plot 1200 using a random forest classifier with all variables. The figure provides a precision-recall plot for the random forest classifier with all variables. The precision-recall is used to evaluate the accuracy of the model as a function of different probability thresholds in the classifier for each prediction year. A model that is highly predictive bows towards (1,1) in the plot. Additional statistics are provided to evaluate the performance of the classifier. An F-1 score evaluates the number of true and false positives to provide an accuracy score of 100%, if perfect. Area-under-curve (AUC) provides the integral of the precision-recall plot where a 1.0 represents a perfect prediction. Average-precision (AP) and Average-recall (AR) weights the average precision across thresholds with 1.0 providing a perfect prediction.

Figure 13:
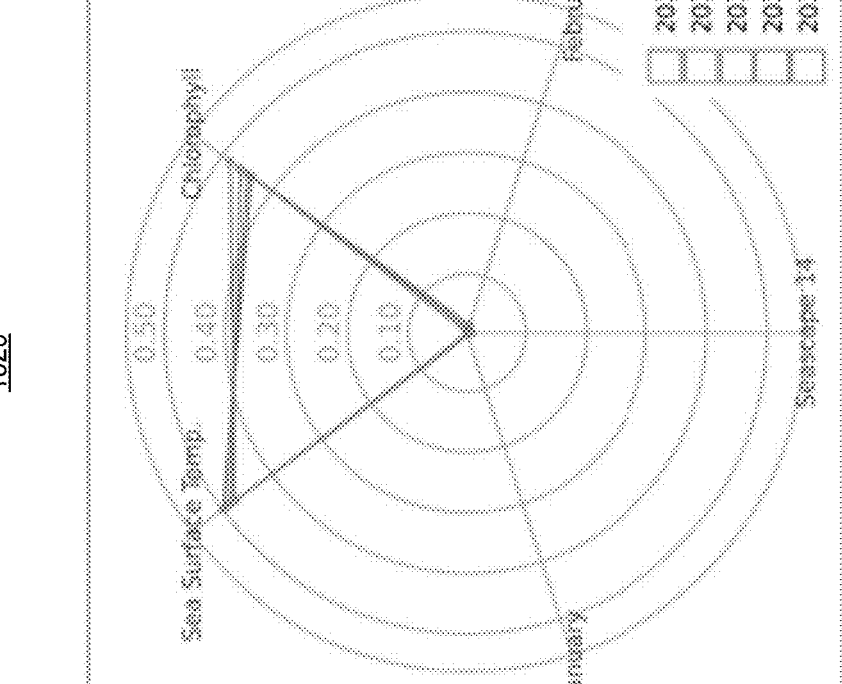
FIG. 13 illustrates plots showing the top five predictors from the random forest classifier.
Figure 13:
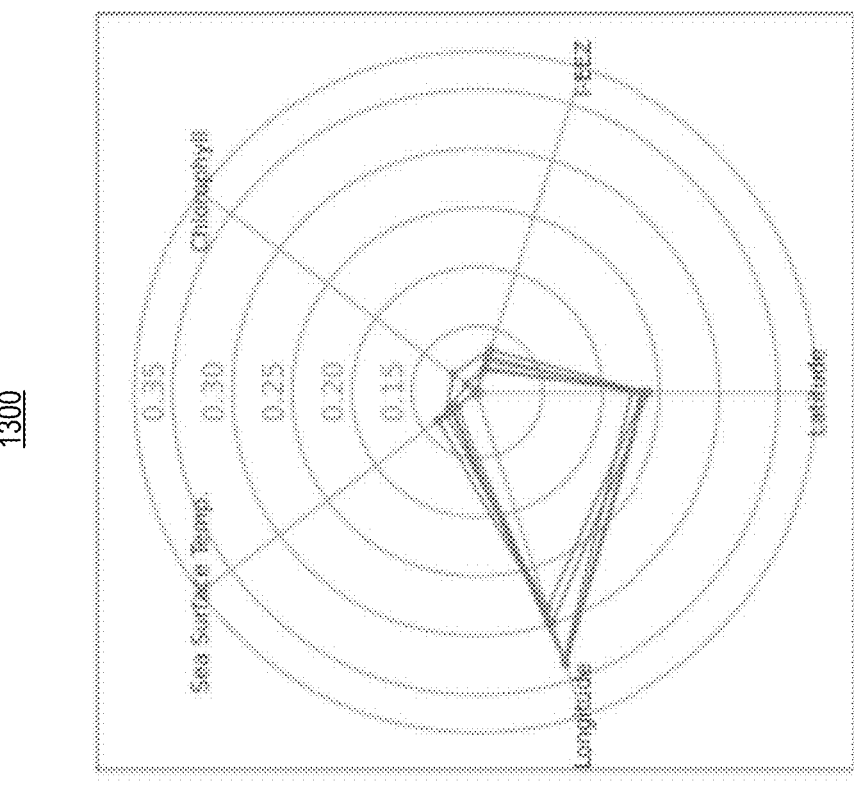

FIG. 13 illustrates plots 1300 and 1320 showing best predictors from a random forest classifier. The top five predictors used for predicting illegal fishing on the Patagonian shelf from the random forest classifier for the primary model (Panel A, plot 1300) and model with only oceanographic variables (Panel B, plot 1320). In Panel A, location variables (longitude and latitude) were the most important predictors; i.e., it is an obvious condition that in order for a DWF vessel to fish illegally in the Argentine EEZ, it must first be in the Argentine EEZ. In Panel B, sea surface temperature and chlorophyll were the best predictors.

Figure 14:
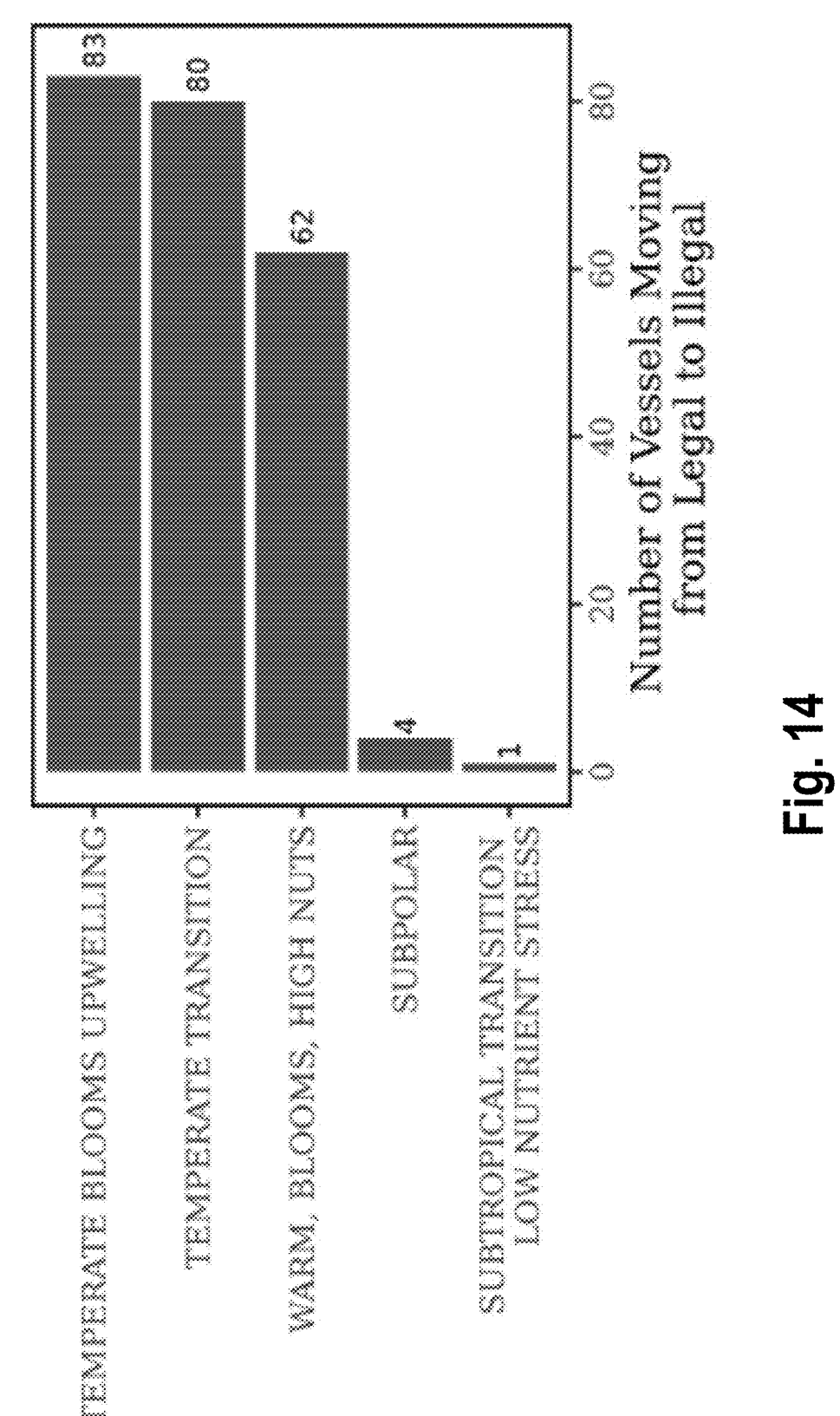
FIG. 14 illustrates a plot showing Seascape transition from legal to illegal region.

FIG. 14 illustrates plot 1400 showing Seascape transition from legal to illegal regions. The plot shows a number of fishing vessels that change status from fishing legally to illegally as they move to a given seascape. The behavior of fishing vessels shows they choose to operate illegally if a seascape associated with productive fishing (e.g. the temperature bloom upwelling seascape) is within the Argentine EEZ.

Figure 15:
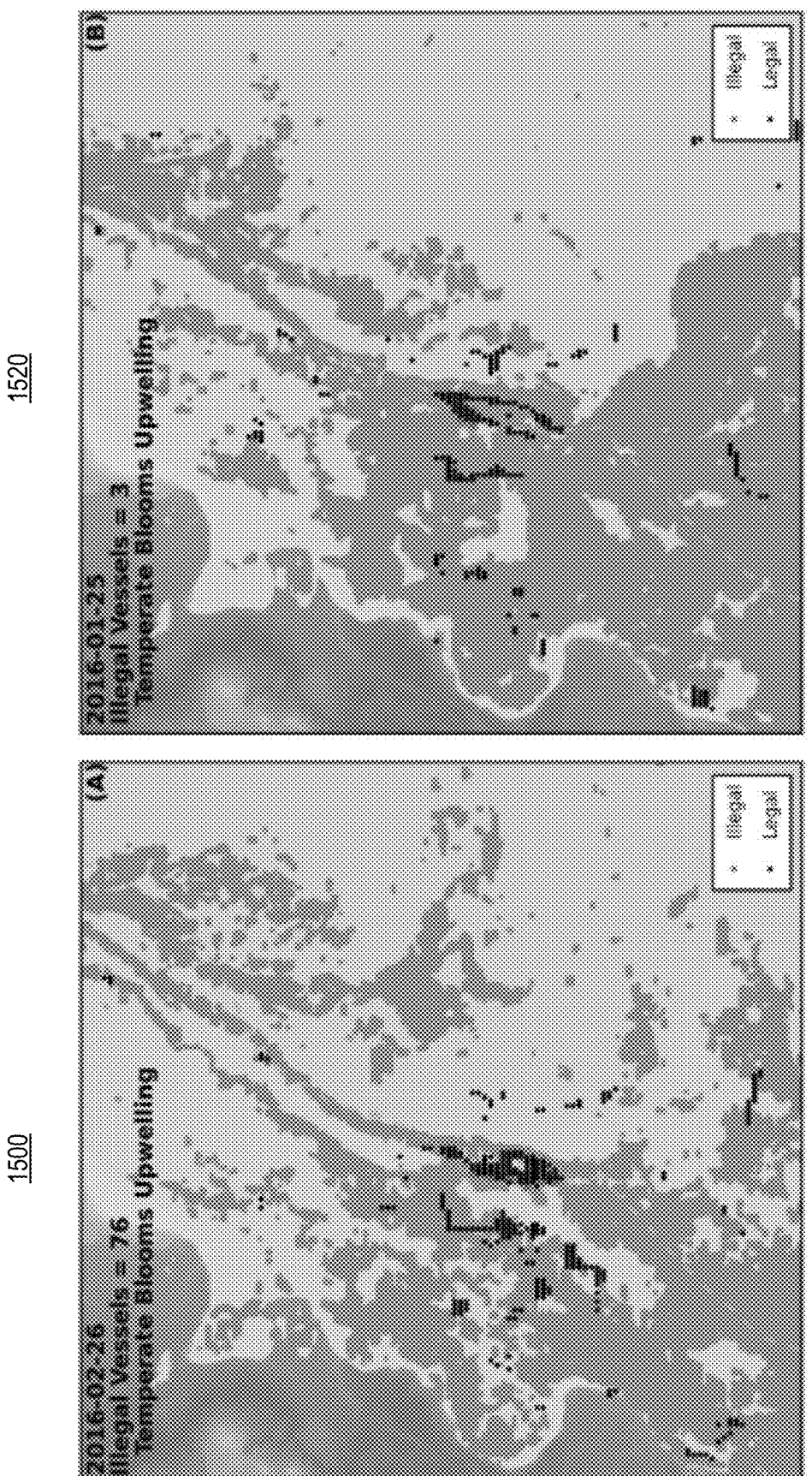
FIG. 15 illustrates pictures of seascapes with large and small illegal vessel activity.

FIG. 15 illustrates pictures 1500 and 1520 of seascapes with large and small illegal vessel activity. Shown, is a map of the Patagonian Shelf with high levels of illegal fishing (Panel A n=76) and low levels of illegal fishing (Panel B n=3) for two days in 2016. The EEZ is shown as an orange dashed line. Red dots represent illegal fishing vessels and black dots represent legal fishing. An important seascape associated with fishing, the "temperate bloom upwelling" seascape, is shown in dark blue. In general, as the area covered by this seascape diminishes we see a rise in the number of illegal fishing events. This suggests that a spatial concentration of fishing effort, driven by changes in the spatial distribution of certain seascapes, can promote illegal fishing in the region.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

Arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details are set forth in order to describe example embodiments of the disclosure, it should be apparent to one skilled in the art that the disclosure can be practiced without, or with variation of, these specific details. The description is thus to be regarded as illustrative instead of limiting.

Following examples illustrates the various embodiments. Any one example can be combined with other examples described herein.

Example 1: A machine-readable storage media having machine-readable instructions that, when executed, cause one or more machines to perform a method comprising: receiving records of locations of objects; storing the received records in memory; processing the received records by applying a distributed process; applying a prediction scheme on the processed records to identify an anomalous behavior among the objects; and issuing a notification if an anomaly behavior is identified.

Example 2: The machine-readable storage media of example 1, wherein processing the received record comprises: calculating pairwise nearest neighbor Haversine distances of the objects in a region; and calculating, for a time period, probability density functions of the pairwise nearest neighbor Haversine distances.

Example 3: The machine-readable storage media of example 2, wherein applying the prediction scheme comprises: measuring a distance between two probability density functions of the probability density functions; and computing mean and kurtosis of the distance.

Example 4: The machine-readable storage media of example 3, wherein the notification is issued if the mean or kurtosis is greater than a threshold.

Example 5: The machine-readable storage media of example 4, wherein the threshold is substantially 95th percentile of a null distribution.

Example 6: The machine-readable storage media of example 4, wherein the threshold is programmable.

Example 7: The machine-readable storage media of example 3, wherein measuring the distance between the two probability density functions comprises: applying one of: Kolmogorov-Smirnov statistic, Hamming distance, or Kullback-Leibler divergence.

Example 8: The machine-readable storage media of example 1, wherein processing the received records comprises: identifying nearest predictors to locations of the objects to make predictions using real-time data or projections of future records; and applying a machine-learning model on the real-time data.

Example 9: The machine-readable storage media of example 8, wherein applying the prediction scheme comprises: classifying the objects as illegal or legal operating objects based on the application of the machine-learning model; and retraining the machine-learning model with results of the classification.

Example 10: The machine-readable storage media of example 9, wherein the notification is issued if the classification of the objects provides a prediction of an illegal operating object.

Example 11: The machine-readable storage media of example 1, wherein the records of locations of objects are received via a satellite.

Example 12: An apparatus comprising: a memory to store records of locations of vessels received from another device; and a processor circuitry coupled to the memory, wherein the processor circuitry is to execute one or more instructions to: process the received records by application of a distributed process; apply a prediction scheme on the processed records to identify an anomaly behavior among the objects; and issue an alert if an anomaly behavior is identified.

Example 13: The apparatus of example 12, wherein to process the received records, the processor circuitry is to: calculate pairwise nearest neighbor Haversine distances of the objects in a region; and calculate, for a time period, probability density functions of the pairwise nearest neighbor Haversine distances.

Example 14: The apparatus of example 13, wherein to apply the prediction scheme, the processor circuitry is to: measure a distance between two probability density functions of the probability density functions; and compute mean and kurtosis of the distance.

Example 15: The apparatus of example 14, wherein the alert is issued if the mean or kurtosis is greater than a threshold.

Example 16: The apparatus of example 15, wherein the threshold is substantially 95th percentile of a null distribution.

Example 17: The apparatus of example 14, wherein to measure the distance between the two probability density functions, the processor circuitry is to: apply one of: Kolmogorov-Smirnov statistic, Hamming distance, or Kullback-Leibler divergence.

Example 18: The apparatus of example 12, wherein to process the received record, the processing circuitry is to: identify nearest predictors to locations of the objects to make predictions using real-time data or projections of future records; and apply a machine-learning model on the real-time data.

Example 19: The apparatus of example 18, wherein to apply the prediction scheme, the processor circuitry is to: classify the vessels as illegal or legal operating vessels based on the application of the machine-learning model; and retrain the machine-learning model with results of the classification.

Example 20: A method comprising: receiving transponder records of locations of vessels; storing the received transponder records in memory; processing the received transponder records by applying a distributed process; applying a prediction scheme on the processed transponder records to identify an anomaly behavior among the vessels; and issuing a notification if an anomaly behavior is identified.

Example 21: The method of example 20, wherein processing the received record comprises: calculating pairwise nearest neighbor Haversine distances of the vessels in a region; and calculating, for a time period, probability density functions of the pairwise nearest neighbor Haversine distances.

Example 22: The method of example 21, wherein applying the prediction scheme comprises: measuring a distance between two probability density functions of the probability density functions; and computing mean and kurtosis of the distance.

Example 23: The method of example 22, wherein the notification is issued if the mean or kurtosis is greater than a threshold.

Example 24: The method of example 24, wherein the threshold is substantially 95th percentile of a null distribution.

Example 25: The method of example 24, wherein the threshold is programmable.

Example 26: The method of example 24, wherein measuring the distance between the two probability density functions comprises: applying one of: Kolmogorov-Smirnov statistic, Hamming distance, or Kullback-Leibler divergence.

Example 27: The method of example 20, wherein processing the received transponder records comprises: identifying nearest predictors to locations of the vessels to make predictions using real-time data or projections of future records; and applying a machine-learning model on the real-time data.

Example 28: The method of example 17, wherein applying the prediction scheme comprises: classifying the vessels as illegal or legal operating vessels based on the application of the machine-learning model; and retraining the machine-learning model with results of the classification.

Example 29: The method of example 28, wherein the notification is issued if the classification of the vessels provides a prediction of an illegal operating vessel.

Example 30: The method of example 20, wherein the records of locations of vessels are received via satellite.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A non-transitory machine-readable storage media having machine readable instructions that, when executed, cause one or more machines to perform a method comprising:

receiving, via a satellite, real-time data that includes records of locations of objects, wherein the satellite receives the real-time data from one or more location transponders on the objects;

storing the records, received via the satellite, in memory;

processing the records, received via the satellite, by applying a distributed process, wherein processing the records comprises identifying nearest one or more predictors related to the locations of the objects to forecast changes based on the real-time data or projections of future records, and wherein the one or more predictors comprise oceanographic predictors;

calculating pairwise nearest neighbor Haversine distances of the objects in a region;

predicting for a future time, based on the forecasted changes in the one or more predictors, an anomalous behavior among the objects with a prediction scheme, wherein the prediction scheme includes a machine-learning model configured to classify regions where illegal activity is likely to occur in the future time, and wherein the machine-learning model is trained using historical maritime vessel movement patterns and oceanographic predictors;

calculating, for a time period, probability density functions of the pairwise nearest neighbor Haversine distances;

measuring a distance between two probability density functions of the probability density functions, wherein measuring the distance between two probability density functions comprises measuring a distance between a current probability density function and each of a plurality of lagged probability density functions from previous time periods by applying a Kolmogorov-Smirnov statistic;

computing mean and kurtosis of the distance to create anomaly indices indicative of illegal activity; and issuing an electronic notification, based on the prediction, that assists maritime law enforcement to prevent or intervene in activities that are illegal, wherein the electronic notification is issued if the mean or kurtosis is greater than a threshold.

2. The non-transitory machine-readable storage media of claim 1, wherein the threshold is substantially 95th percentile of a null distribution calculated from null periods where illegal activities were suspected to not have occurred.

3. The non-transitory machine-readable storage media of claim 1, wherein the threshold is programmable.

4. The non-transitory machine-readable storage media of claim 1, wherein measuring the distance between the two probability density functions comprises:

applying one of: Kolmogorov-Smirnov statistic, Hamming distance, or Kullback-Leibler divergence.

5. The non-transitory machine-readable storage media of claim 1, wherein predicting for the future time comprises:

classifying the objects as illegal or legal operating objects based on the machine-learning model; and retraining the machine-learning model based on classifying the objects.

6. The non-transitory machine-readable storage media of claim 5, wherein the electronic notification is issued if classification of the objects provides a prediction of an illegal operating object.

7. An apparatus comprising:

a memory to store real-time data including received records of locations of vessels received from another device; and a processor circuitry coupled to the memory, wherein the processor circuitry is to execute one or more instructions to:

process the received records by application of a distributed process, and identify nearest one or more predictors related to the locations of the vessels to changes based on the real-time data or projections of future records, wherein the one or more predictors comprise oceanographic predictors;

predict for a future time, based on forecasted changes in the one or more predictors, with a prediction scheme an anomalous behavior among the vessels, wherein the prediction scheme includes a machine-learning model configured to classify regions where illegal activity is likely to occur in the future time;

calculate pairwise nearest neighbor Haversine distances of the vessels in a region;

calculate, for a time period, probability density functions of the pairwise nearest neighbor Haversine distances;

measure a distance between two probability density functions of the probability density functions by measuring a distance between a current probability density function and each of a plurality of lagged probability density functions from previous time periods by applying a Kolmogorov-Smirnov statistic;

compute mean and kurtosis of the distance to create anomaly indices indicative of illegal activity; and issue an electronic alert based on the prediction that assists maritime law enforcement to prevent or intervene in activities that are illegal, wherein the electronic alert is issued if the mean or kurtosis is greater than a threshold.

8. The apparatus of claim 7, wherein the threshold is substantially 95th percentile of a null distribution calculated from null periods where illegal activities were suspected to not have occurred.

9. The apparatus of claim 7, wherein to measure the distance between the two probability density functions, the processor circuitry is to:

apply one of: Kolmogorov-Smirnov statistic, Hamming distance, or Kullback-Leibler divergence.

10. The apparatus of claim 7, wherein to apply the prediction scheme, the processor circuitry is to:

classify the vessels as illegal or legal operating vessels based on the machine-learning model; and retrain the machine-learning model based on classifying the vessels.

11. A method comprising:

receiving, by a satellite, real-time data that includes transponder records of locations of vessels, wherein the satellite receives the real-time data from one or more location transponders on the vessels;

storing the transponder records, received by the satellite, in a memory;

processing the transponder records, stored in the memory, by applying a distributed process, wherein the distributed process provides a prediction scheme that measures a distance between two probability density functions associated with the locations of the vessels to forecast changes based on the real-time data;

predicting for a future time, based on forecasted changes with a prediction scheme, an anomalous behavior among the vessels, wherein the prediction scheme includes a machine-learning model configured to classify regions where illegal activity is likely to occur in the future time;

calculating pairwise nearest neighbor Haversine distances of the vessels in a region;

calculating, for a time period, probability density functions of the pairwise nearest neighbor Haversine distances;

measuring a distance between two probability density functions of the probability density functions, wherein measuring the distance between two probability density functions comprises measuring a distance between a current probability density function and each of a plurality of lagged probability density functions from previous time periods by applying a Kolmogorov-Smirnov statistic;

computing mean and kurtosis of the distance to create anomaly indices indicative of illegal activity; and issuing an electronic notification on identification of the anomalous behavior, wherein the electronic notification is issued based on a mean or a kurtosis in relation to a threshold, wherein the electronic notification assists maritime law enforcement to prevent or intervene in activities that are illegal, wherein the electronic notification is issued if the mean or kurtosis is greater than a threshold.

* * * * *